US012779765B2

(12) United States Patent
Yakabe et al.

(10) Patent No.: US 12,779,765 B2
(45) Date of Patent: Nov. 3, 2026

(54) TUBE EXPANSION TOOL

(71) Applicant: MAKITA CORPORATION, Anjo (JP)

(72) Inventors: Koichi Yakabe, Anjo (JP); Hiroki Ikuta, Anjo (JP)

(73) Assignee: MAKITA CORPORATION, Anjo (JP)

( * ) Notice: Subject to any disclaimer, the term of this patent is extended or adjusted under 35 U.S.C. 154(b) by 34 days.

(21) Appl. No.: 18/867,117

(22) PCT Filed: Apr. 18, 2023

(86) PCT No.: PCT/JP2023/015400
§ 371 (c)(1),
(2) Date: Nov. 19, 2024

(87) PCT Pub. No.: WO2024/004342
PCT Pub. Date: Jan. 4, 2024

(65) Prior Publication Data

US 2025/0319647 A1 Oct. 16, 2025

(30) Foreign Application Priority Data

Jun. 30, 2022 (JP) ................................ 2022-105879
Jul. 6, 2022 (JP) ................................ 2022-108915

(51) Int. Cl.
*B29C 57/04* (2006.01)
*B29K 23/00* (2006.01)
*B29L 23/00* (2006.01)

(52) U.S. Cl.
CPC ...... *B29C 57/04* (2013.01); *B29K 2023/0691* (2013.01); *B29L 2023/22* (2013.01)

(58) Field of Classification Search
CPC .................... B29C 57/04; B29K 23/00; B29K 2023/0691; B29L 23/00; B29L 2023/22; B21D 41/028; B21D 39/20
See application file for complete search history.

(56) References Cited

U.S. PATENT DOCUMENTS 5,744,085 A 4/1998 Sorberg
9,862,137 B2 1/2018 Dickert et al.
(Continued)

FOREIGN PATENT DOCUMENTS

JP 2019-000894 A 1/2019
JP 2019-000895 A 1/2019
(Continued)

OTHER PUBLICATIONS

Jun. 27, 2023 International Search Report issued in International Patent Application No. PCT/JP2023/015400.
(Continued)

*Primary Examiner* — Alison L Hindenlang
*Assistant Examiner* — Shibin Liang
(74) *Attorney, Agent, or Firm* — Oliff PLC

(57) ABSTRACT

A tube expansion tool for expanding an end of a synthetic resin fluid pipe has a motor shaft rotated by an electric motor, a feed screw mechanism for converting rotation of the motor shaft into front-and-rear movement of an output shaft, a wedge provided on a front portion of the output shaft for pushing a plurality of jaws. The plurality of jaws mutually opens radially outward. The tube expansion tool further has a jaw rotation mechanism and a shaft. The shaft rotates around an axis in conjunction with the rotation of the motor shaft. The shaft rotates the plurality of jaws around its axis. The output shaft, the motor shaft, and the shaft of the jaw rotation mechanism are arranged in parallel with each other and overlap in the front-rear direction.

19 Claims, 20 Drawing Sheets

(56) References Cited

U.S. PATENT DOCUMENTS

| | | | |
|---|---|---|---|
| 2010/0308503 | A1* | 12/2010 | Schramm .............. B29C 57/045 264/312 |
| 2013/0140739 | A1 | 6/2013 | Lundequist et al. |
| 2016/0361864 | A1 | 12/2016 | Dickert et al. |
| 2019/0257097 | A1 | 8/2019 | Kawai et al. |
| 2020/0130047 | A1* | 4/2020 | Yabunaka .............. B21J 15/043 |
| 2020/0261959 | A1 | 8/2020 | Wekwert et al. |
| 2022/0168793 | A1 | 6/2022 | Davies et al. |
| 2022/0324008 | A1 | 10/2022 | Davies et al. |
| 2023/0141074 | A1 | 5/2023 | Yakabe et al. |

FOREIGN PATENT DOCUMENTS

| | | | |
|---|---|---|---|
| JP | 2019-141933 | A | 8/2019 |
| JP | 2021-041418 | A | 3/2021 |
| JP | 2023-069279 | A | 5/2023 |
| WO | 95/10000 | A1 | 4/1995 |
| WO | 2009/000966 | A1 | 12/2008 |
| WO | 2012/022665 | A1 | 2/2012 |
| WO | 2016/201196 | A1 | 12/2016 |
| WO | 2022/217092 | A1 | 10/2022 |

OTHER PUBLICATIONS

Jul. 3, 2026 Office Action issued in Japanese Patent Application No. 2022-108915.

* cited by examiner

TUBE EXPANSION TOOL

CROSS-REFERENCE TO RELATED APPLICATIONS

The present application is a 35 U.S.C. § 371 U.S. National Phase entry of, and claims priority to, PCT Application PCT/JP2023/015400 filed Apr. 18, 2023, which claims priority to Japanese Patent Application No. 2022-105879 filed Jun. 30, 2022 and No. 2022-108915 filed Jul. 6, 2022, which are hereby incorporated herein by reference in its entirety for all purposes.

BACKGROUND

One embodiment of the present disclosure relates to tubing expansion tools for expanding a diameter of an end of a fluid pipe, such as one made of synthetic resin, to be coupled to a connected body.

For example, there are cases where a fluid pipe made of PEX (cross-linked polyethylene) (hereinafter, referred to as a PEX tubing) is coupled to a connected body such as a pipe made of resin. Tube expansion tools have been conventionally provided to expand an inner diameter of an end of a PEX tubing. The end of the PEX tubing is expanded in diameter using a tube expansion tool and attached to the connected body. The end of the PEX tubing gradually reduces in diameter due to elastic deformation to return to its original diameter. This allows the end of the PEX tubing to be tightly coupled to the connected body. The PEX tubing is firmly secured to the connected body using its own elasticity.

U.S. Pat. No. 9,862,137 describes a tube expansion tool for expanding a diameter of a PEX tubing using an electric motor as the drive source. The tube expansion tool is provided with a wedge having a substantially conical front end and a plurality of jaws arranged in front of the wedge in a circumferential direction of the wedge. The wedge is attached to a front end of an output shaft that moves back-and-forth inside the tube expansion tool. As the wedge moves forward with the output shaft, the plurality of jaws are pushed by the wedge and mutually open radially outward from the wedge. An end of the PEX tuning can be expanded by opening the plurality of jaws radially outward with the jaws entered an end opening of the PEX tubing For example, if a tube expansion tool has six jaws, the end of the PEX tubing is subjected to a radially outward opening force from each jaw at six equally spaced locations in the circumferential direction. Therefore, in a single expanding operation, the end of the PEX tubing is expanded into a substantially hexagonal shape. In order to expand the end of the PEX tubing to a circular shape, expanding operations are repeated alternately with rotating operations in which the plurality of jaws is rotated at a predetermined angle (e.g., 15° to 30°) in the circumferential direction of the wedge. This causes the position at which each jaw contacts the inner circumferential surface of the PEX tubing to shift with the rotating operation. Therefore, the end of the PEX tubing is uniformly expanded to become close to a circular shape.

For example, a PEX tubing may be installed between two mutually opposing and narrowly spaced walls (see FIG. 2). For better workability in expanding the end of a PEX tubing installed in the narrow space, it is preferable for the tube expansion tool to be compact in a front-rear direction. The tube expansion tool includes a power conversion mechanism configured to convert a rotary drive of an electric motor into back-and-forth movement of the output shaft and a jaw rotation mechanism for rotating the jaws. As described in U.S. Pat. No. 9,862,137, in a conventional tube expansion tool, the jaw rotation mechanism is disposed coaxially with the output shaft. Therefore, it was difficult to provide the pipe expansion tool in a compact manner in the front-rear direction.

U.S. Patent Publication No. 2020/0261959 also describes a tube expansion tool that expands a PEX tubing using a feed screw mechanism driven by an electric motor as a power source. A substantially conical wedge is provided at a front portion of the tube expansion tool. The substantially conical wedge moves forward or rearward by the feed screw mechanism with respect to an end of a PEX tubing. A plurality of jaws is arranged in front of the wedge and in a circumferential direction of the wedge. The plurality of jaws is pushed by the forwardly moving wedge and mutually opens radially outward from the wedge. The end of the PEX tubing is expanded by opening the plurality of jaws radially outward with the jaws that is entered an end opening of the PEX tubing. During the typical expanding operation of the PEX tubing, the jaw opening motion is usually repeated multiple times to expand the PEX tubing to a predetermined size. The jaw opening motions required to expand the PEX tubing to a predetermined size may be, for example, 12 to 18 times for a 1-inch diameter PEX tubing.

In a conventional tube expansion tool, a single start-up operation (ON operation of a trigger) by a user causes a single jaw opening motion. Therefore, the user needed to repeat the start-up operation of the tube expansion tool for a required number of the jaw opening motions, which placed a significant workload on the user.

Therefore, there has been a conventional need for a tube expansion tool that is provided in a compact manner in a front-rear direction. Alternatively, there has been a conventional need for a tube expansion tool that can reduce workload on a user during an expanding operation of a PEX tuning.

SUMMARY

One aspect of the present disclosure relates to a tube expansion tool for expanding an end of a synthetic resin fluid pipe. The tube expansion tool has a motor shaft rotated by an electric motor. A power conversion mechanism converts rotation of the motor shaft into front-and-rear movement of the output shaft. A wedge at a front portion of the output shaft pushes a plurality of jaws. The plurality of jaws mutually opens radially outward. A jaw rotation mechanism with a shaft is provided. The shaft rotates about an axis in conjunction with the rotation of the motor shaft. The shaft causes the plurality of jaws to rotate about an axis. The output shaft, the motor shaft, and the shaft of the jaw rotation mechanism are arranged in parallel with each other and overlap each other in the front-rear direction.

Therefore, the tube expansion tool may be provided in a compact manner in the front-rear direction. Furthermore, the output shaft, the motor shaft, and the shaft are arranged in parallel with each other. The tube expansion tool may be provided in a compact manner also in a direction intersecting the front-rear direction (up-down direction or left-right direction).

DETAILED DESCRIPTION

Figure 1:
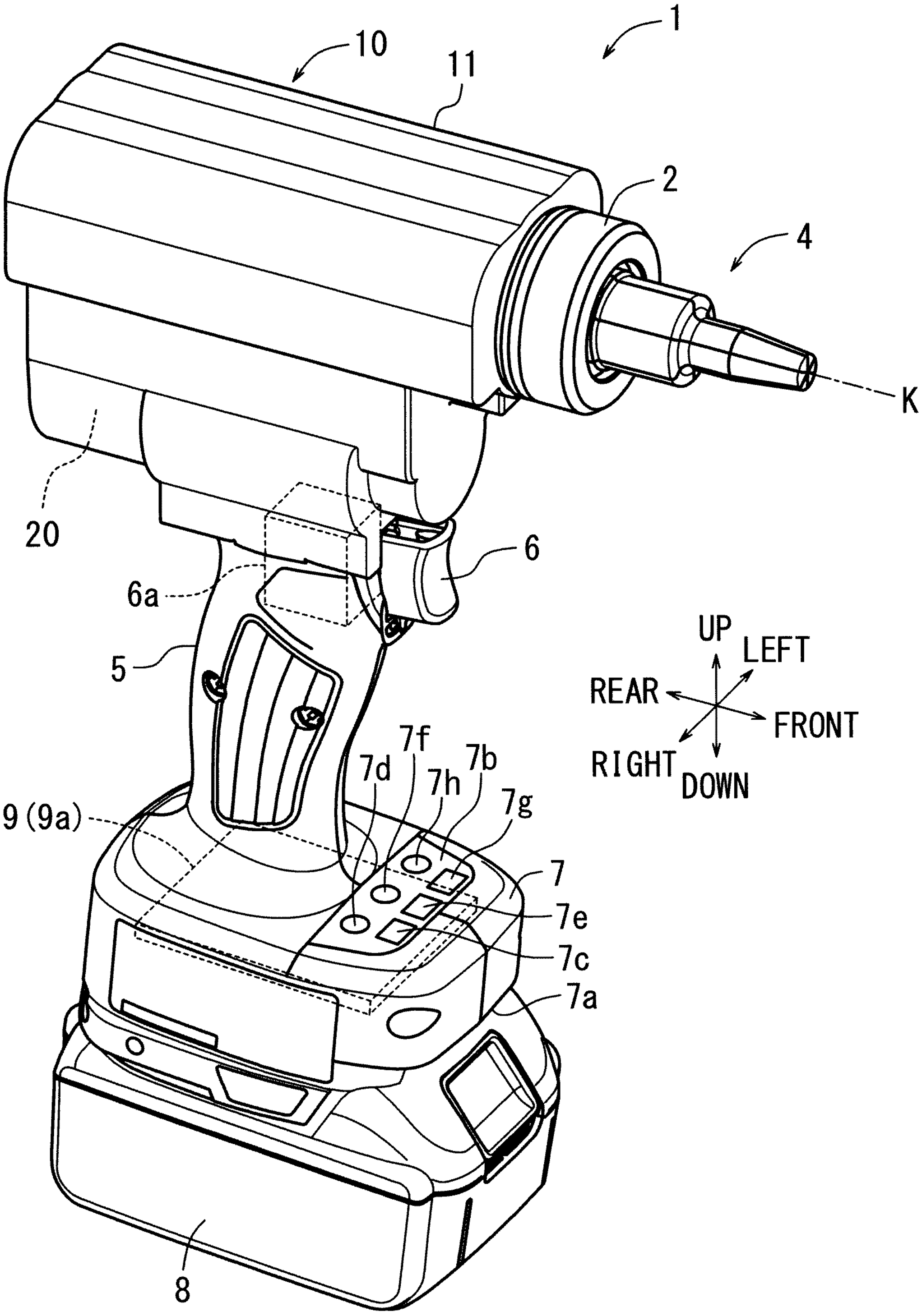
FIG. 1 is a perspective view of a tube expansion tool.

According to another aspect of the present disclosure, a shaft of a jaw rotation mechanism and an electric motor are disposed so that 80% or more of their respective axial lengths overlap an output shaft located at a rear end position in the front-rear direction. Therefore, the amount of protrusion of the shaft of the jaw rotation mechanism and the electric motor in the front-rear direction with respect to the output shaft is suppressed. Particularly, the amount of rearward protrusion with respect to the output shaft at the terminal end position may be suppressed. This allows the pipe expansion tool to achieve greater compactness in the front-rear direction.

According to another aspect of the present disclosure, the shaft of the jaw rotation mechanism and the electric motor are arranged to overlap the output shaft located at the rear end position in the front-rear direction over their respective entire axial lengths. Therefore, the shaft of the jaw rotation mechanism and the electric motor do not protrude in the front-rear direction relative to the output shaft located at the rear end position. This further enhances the compactness of the tube expansion tool in the front-rear direction.

According to another aspect of the present disclosure, the tube expansion tool has a transmission mechanism that changes a rotational output of the motor shaft. An idle gear is provided between the transmission mechanism and the power conversion mechanism. Therefore, the transmission mechanism may be disposed to overlap with the power conversion mechanism in the axial direction (front-rear direction). Thus, the electric motor provided near the transmission mechanism may be installed closer to the power conversion mechanism. This configuration allows the tube expansion tool to be provided in a compact manner in the front-rear direction.

According to another aspect of the present disclosure, the output shaft and the motor shaft are arranged offset in the up-down direction, which is orthogonal to the front-rear direction. The jaw rotation mechanism is located between the output shaft and the motor shaft in the up-down direction as viewed in the axial direction of the output shaft. Therefore, the output shaft, the jaw rotation mechanism, and the electric motor may be compactly arranged not only in the front-rear direction but also in the up-down direction orthogonal to the front-rear direction. This arrangement prevents the tube expansion tool from being elongated in the up-down direction.

According to another aspect of the present disclosure, the jaw rotation mechanism is arranged offset with respect to an imaginary plane that includes both the motor shaft and the output shaft. Therefore, the output shaft, the jaw rotation mechanism, and the electric motor may be compactly arranged in the extending direction (up-down direction) of the imaginary plane in which the motor shaft and the output shaft are aligned. This arrangement allows the tube expansion tool to be provided in a compact manner in the up-down direction.

According to another aspect of the present disclosure, the jaw rotation mechanism includes a one-way clutch. The one-way clutch rotates in conjunction with a first rotation of the shaft to rotate the plurality of jaws. On the other hand, the one-way clutch does not rotate in conjunction with a second rotation opposite to the first rotation of the shaft. The shaft of the jaw rotation mechanism includes a rear shaft and a front shaft that is threadedly coupled to a front portion of the rear shaft. Thus, the shaft of the jaw rotation mechanism is separable into a rear shaft that is assembled into an assembly for rotating the shaft and a front shaft that is assembled into the tool body for transmitting the rotational drive of the shaft to the plurality of jaws. The tool body on the front shaft side and the assembly on the rear shaft side are assembled separately, and after assembly, the front shaft and the rear shaft are connected by threaded engagement in the front-rear direction. This improves the assemblability of the shaft.

According to another aspect of the present disclosure, the front shaft is threadedly coupled to be fastened in a direction of the first rotation with respect to the rear shaft. When the front shaft performs the first rotation, torque is transmitted from the front shaft to the plurality of jaws via the one-way clutch and the torque acts in the direction to fasten the rear shaft against the front shaft. The fastening force between the rear shaft and the front shaft becomes stronger. When the front shaft performs a second rotation, the torque transmitted from the front shaft to the plurality of jaws is subtle in amount. The front shaft idles and performs the second rotation with almost no resistance. The rear shaft rotates in the direction to be loosened from the front shaft, but no resistance is exerted on the front shaft, therefore, rotates without loosening the fastening force with the front shaft. Thus, the operation of the jaw rotation mechanism prevents loosening of the threaded connection between the front shaft and the rear shaft.

According to another aspect of the present disclosure, the power conversion mechanism is a feed screw mechanism equipped with a male thread provided around an outer circumference of the output shaft and a nut for the male thread to be inserted. Therefore, the power conversion mechanism may be installed around the axis of the output shaft. Thus, the power conversion mechanism may be prevented from protruding in the axial direction (front-rear direction) from the output shaft. This allows the tube expansion tool to be provided in a compact manner in the front-rear direction.

According to another aspect of the present disclosure, the tube expansion tool has a grip extending in a direction intersecting the axial direction of the output shaft. At least a part of the nut of the feed screw mechanism and at least a part of the electric motor overlap the grip in the front-rear direction. The nut of the feed screw mechanism and the electric motor may be arranged near the center of support when a user grasps the grip to support the tube expansion tool. This arrangement allows for a good weight balance of the tube expansion tool in the front-rear direction.

According to another aspect of the present disclosure, an end of a fluid pipe, for example, made of synthetic resin, is expanded in diameter by the tube expansion tool. The tube expansion tool has a female threaded member. The female threaded member is configured to rotate forward when the electric motor rotates forward and to rotate backward when the electric motor rotates backward. A threaded shaft is threadedly coupled to the female threaded member. The threaded shaft is configured to move forward from an initial position to a terminal end position in response to a forward rotation of the female threaded member. The threaded shaft is configured to move rearward from the terminal end position to the initial position in response to a backward rotation of the female threaded member. A wedge extends forward from the threaded shaft. The wedge pushes the plurality of jaws as the wedge moves forward with the threaded shaft. The plurality of jaws mutually open radially outward. An operation member is provided to start the electric motor. A controller repeatedly rotates the electric motor forward and backward during operation of the operation member to open the plurality of jaws multiple times.

The jaws are opened multiple times during a single operation of the operation member. The workload on the user is thus reduced.

According to another aspect of the present disclosure, at least one of the initial position and the terminal end position of the threaded shaft is detected by a detection means. Therefore, the reciprocating motion of the threaded shaft may be performed quickly and reliably.

According to another aspect of the present disclosure, both the initial position and the terminal end position of the threaded shaft are detected by a detection means, respectively. Therefore, the reciprocating motion of the threaded shaft is performed more quickly and reliably.

According to another aspect of the present disclosure, the controller rotates the electric motor backward to cause the threaded shaft to return to its initial position after the operation of the operation member is released. When the operation member stops operating, the threaded shaft moves rearward and returns to its initial position, thereby ensuring that the jaws are returned to the closed position.

According to another aspect of the present disclosure, the controller rotates the electric motor backward that makes the threaded shaft to return to the initial position when the operation member starts operating, if the threaded shaft is not in the initial position when the operation of the operation member started. The threaded shaft stops moving forward from an intermediate position. As a result, the jaw opening motion does not start from a half-open position, but always starts from the closed position.

According to another aspect of the present disclosure, the controller counts a number of reciprocating motions of the threaded shaft between the initial position and the terminal end position during operation of the operation member. The controller stops the electric motor from being rotating, when the number of reciprocating motions reaches to a predetermined threshold of number of times. Thus, even during the operation of the operation member, the electric motor automatically stops once the jaw opening motions have been performed for the predetermined threshold of number of times. This ensures a proper diameter expanding operation to be performed quickly.

According to another aspect of the present disclosure, the controller calculates a number of reciprocating motions based on a rotational number of the electric motor. As the rotational number of the electric motor reaches the predetermined threshold of number of times, the electric motor automatically stops after the threaded shaft is returned to its initial position. This reduces the workload on the user for multiple diameter expanding operations of the jaws.

According to another aspect of the present disclosure, the detection means is a Hall IC sensor. Accordingly, one or both of the initial position and the terminal end position of the threaded shaft are detected by the Hall IC sensor.

According to another aspect of the present disclosure, the detection means is a detection circuit that detects a position of the threaded shaft based on a rotational number of the electric motor. Therefore, one or both of the initial position and the terminal end position of the threaded shaft are detected by the detection circuit.

According to another aspect of the present disclosure, the tube expansion tool has a ball screw with a ball interposed between the threaded shaft and the female threaded member. Therefore, the threaded shaft may be threadedly coupled smoothly and without rattling against the female threaded member. This allows the threaded shaft to reciprocate precisely and smoothly.

Hereinafter, one embodiment of the present disclosure will be described with reference to FIGS. 1 to 20. As shown in FIG. 1, a tube expansion tool 1 according to this embodiment includes a tool body 10 accommodated in a body housing 11 and a grip 5 extending downward from a lower portion of the body housing 11. A user grasps the grip 5 while positioned substantially behind the tube expansion tool 1 (at a far left side in FIG. 1). In the following description, a side in front of the user will be referred to as a rear side and a side opposite to the user side will be referred to as a front side. Up-down and left-right directions are determined with respect to the user.

Figure 4:
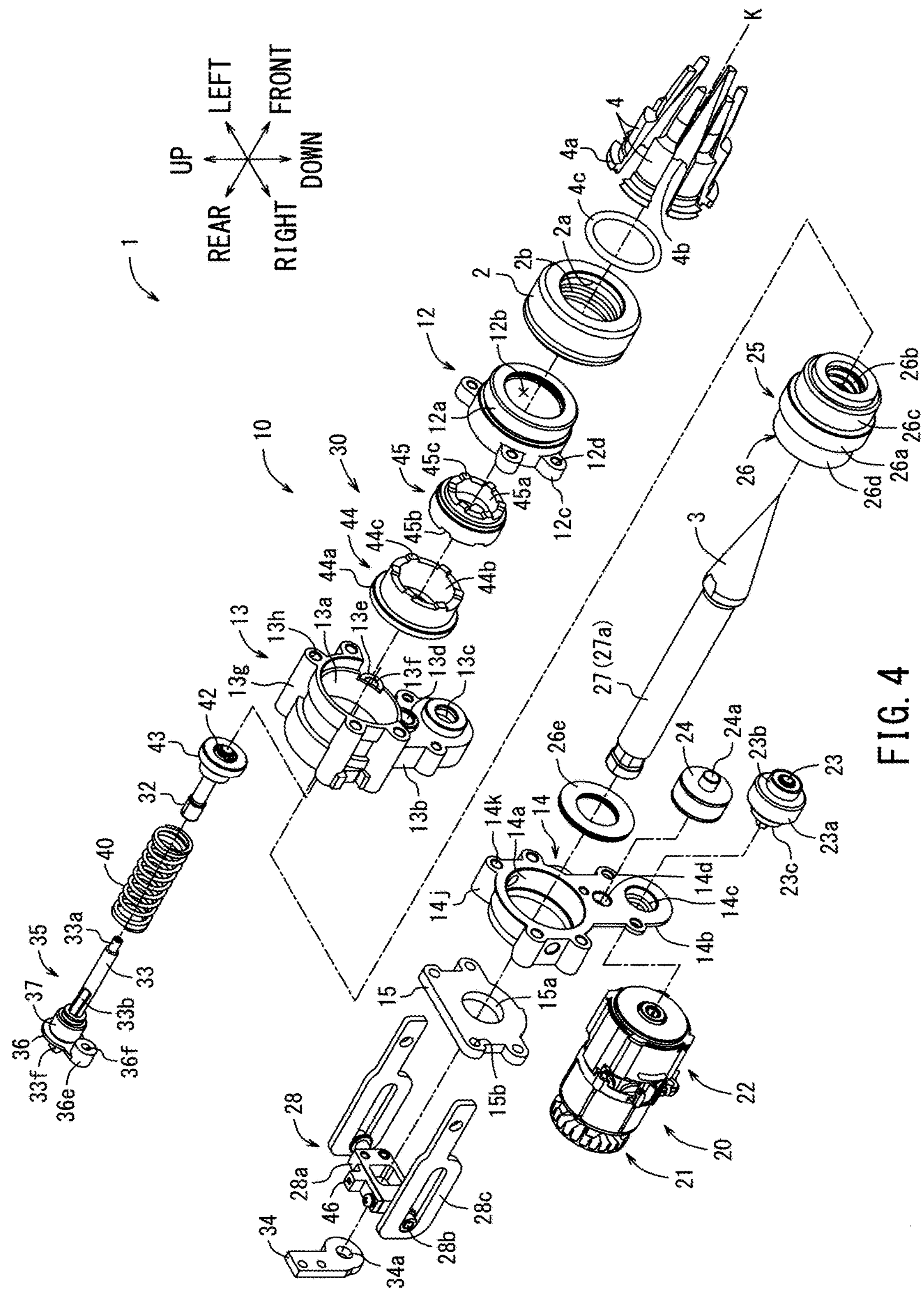
FIG. 4 is an exploded perspective view of the tool body.
Figure 12:
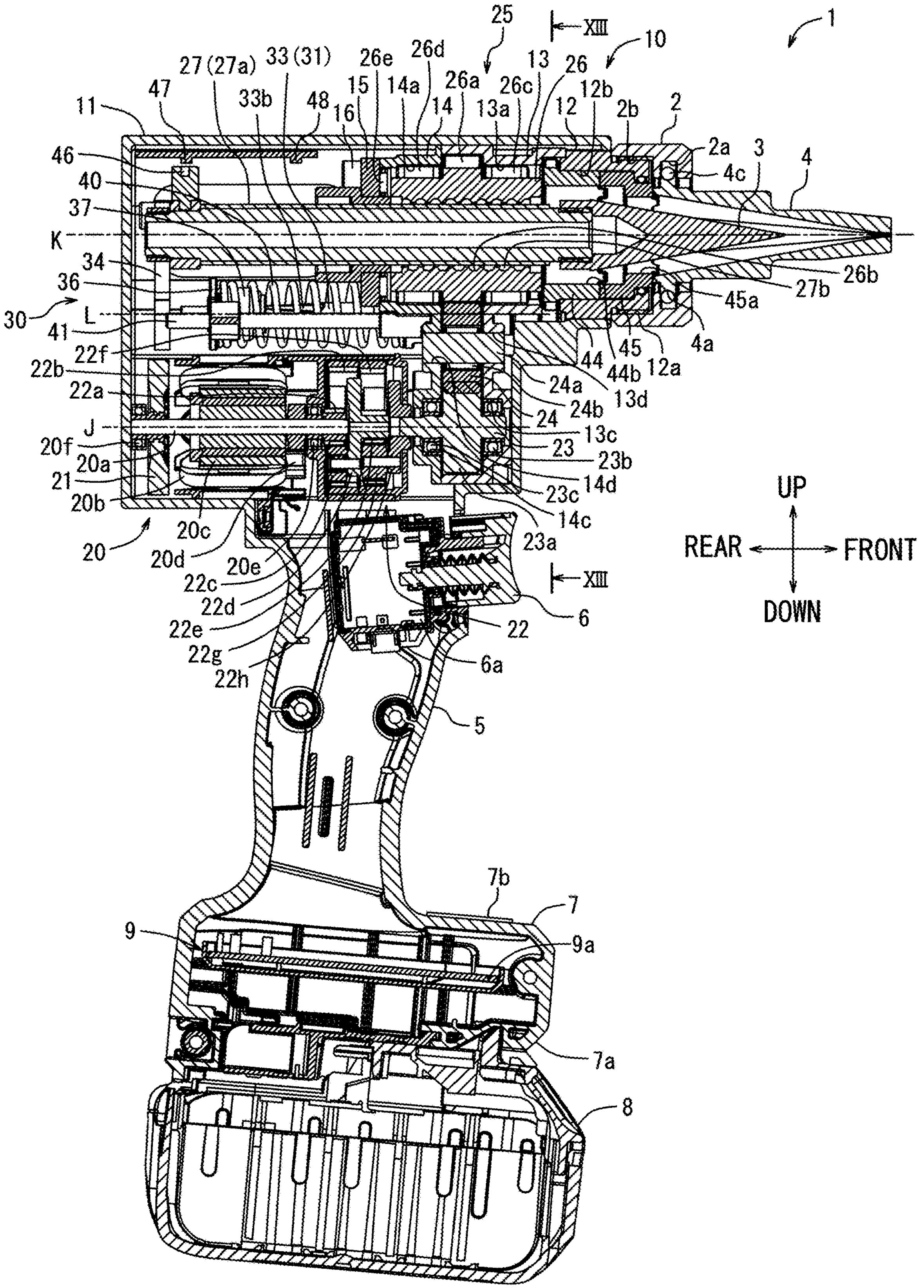
FIG. 12 is a cross-sectional view taken along a line XII-XII in FIG. 9.

As shown in FIGS. 1, 4, and 12, a ring-shaped cap 2 is attached to a front portion of the tool body 10. A columnar output shaft 27 extending in a front-rear direction is provided in a center of the tool body 10. A substantially conical wedge 3 is attached to a front end of the output shaft 27. The wedge 3 is located radially inward of the cap 2. The output shaft 27 and the wedge 3 are disposed on an output axis K extending in the front-rear direction substantially at the center of the tool body 10 in the up-down and left-right directions. The output shaft 27 and the wedge 3 are movable in the front-rear direction along the output axis K between a rearward initial position (rear end position) and a forward terminal end position (front end position). A plurality of jaws 4 extending in the front-rear direction are provided radially outward from the wedge 3 and radially inward from the cap 2. The plurality of jaws 4 are arranged at equal intervals in a circumferential direction of the wedge 3. The tube expansion tool 1 may have, for example, six jaws 4, each jaw 4 being arranged at 60° intervals in the circumferential direction of the wedge 3. The plurality of jaws 4 can open and close radially between a closed position where they closely contact each other in the circumferential direction to cover the wedge 3 and an open position where they open each other radially outward to expose an end of the wedge 3.

As shown in FIGS. 1 and 12, a trigger-type operation member (e.g., switch lever) 6 is provided on a front side of the grip 5. The user can operate the operation member 6 by pulling it while grasping the grip 5. A switch body 6*a* is provided within the grip 5, which is switched ON and OFF in conjunction with an operation of the operation member 6. The switch body 6*a* is in an OFF state when the operation member 6 is not pulled, and is in an ON state when the operation member 6 is pulled. A substantially rectangular box-shaped enlarged diameter portion 7 is provided at a lower end of the grip 5, which expands in the front-back direction and the left-right direction. The controller 9 is accommodated in the enlarged diameter portion 7. The controller 9 includes a shallow-bottomed rectangular box-shaped case and a resin-molded control board accommodated within the case. The controller 9 is accommodated in the enlarged diameter portion 7 with a thickness direction (a direction in which a shortest side of the case extends) aligned with the up-down direction. The controller 9 primarily controls a drive of an electric motor 20, which will be described later.

As shown in FIG. 1, an operation panel 7*b* is provided on an upper side of the enlarged diameter portion 7. Various operation buttons are arranged on the operation panel 7*b*, for example, to predetermine a number of open/close motions of the jaws 4. When the operation button 7*c* is pressed and held, the operation panel 7*b* is activated. The activation state is shown by an illumination of the display 7*d*. By pressing to operate the operation button 7*e* in the activation state, tens-digit of a predetermined value can be determined. The tens-digit is displayed numerically on a display 7*f*. Similarly, by pressing to operate the control button 7*g* in the activation state, ones-digit of the predetermined value can be determined. The ones-digit is displayed numerically on a display 7*h*. The user can predetermine the number of open/close motions of the jaw 4 by pressing to operate the operation buttons 7*e* and 7*g*. During one pull operation of the operation member 6, open/close motions of the jaws 4 are performed continuously for the predetermined number of times. When the jaws 4 open and close continuously for the predetermined number of times, the electric motor 20 stops automatically.

As shown in FIG. 1, a lower side of the enlarged diameter portion 7 is provided with a battery mounting section 7*a* to which a rectangular box-shaped battery 8 can be removably attached. The battery 8 may be removed from the battery mounting section 7*a* by sliding it forward. The battery 8 may be attached to the battery mounting section 7*a* by sliding it rearward from a front of the battery mounting section 7*a*. The battery 8 removed from the battery mounting section 7*a* may be repeatedly recharged for use with a charger that is prepared separately. The battery 8 may also be used as a power source for other electric power tools. The battery 8 serves as a power source to supply electric power to the electric motor 20.

Figure 2:
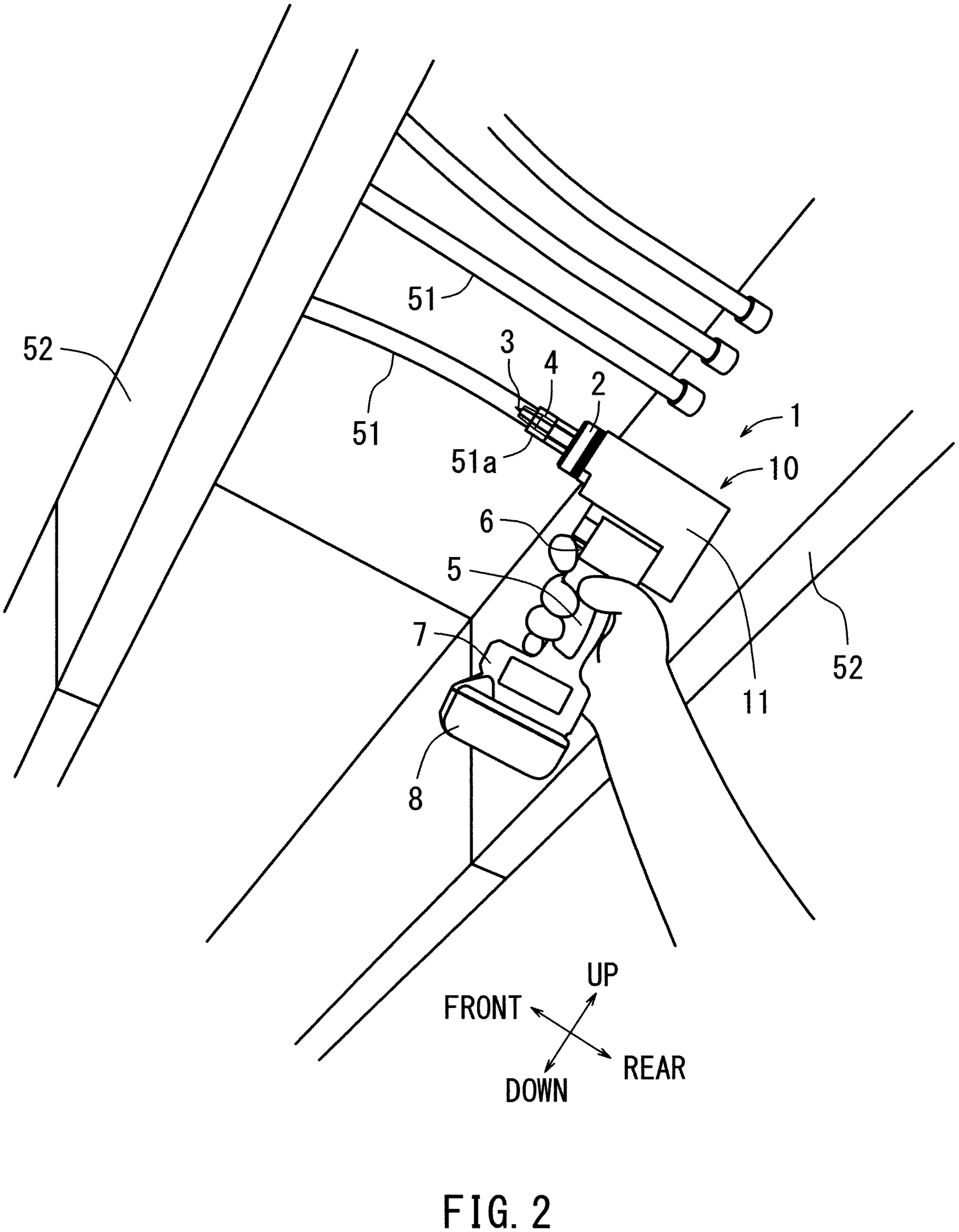
FIG. 2 is a perspective view of the tube expansion tool for expanding an end of a PEX tubing.

As shown in FIG. 2, when using the tube expansion tool 1, the user grasps the grip 5 and inserts the plurality of jaws 4 into an end 51*a* of a synthetic resin PEX tubing 51 (fluid pipe). By pulling the operation member 6, the plurality of jaws 4 opens and closes in the radial direction. This causes the end 51*a* of the PEX tubing 51 to expand in diameter. The PEX tubing 51 is piped, for example, between two opposing walls 52. Therefore, it is preferable that the tube expansion tool 1 has a front-rear length that is allowed to fit into a narrow space between the two walls 52.

As shown in FIG. 4, the tool body 10 houses a front mechanism housing 12, a first center mechanism housing 13, a second center mechanism housing 14, and a rear mechanism housing 15 in order from front to rear. The front mechanism housing 12, the first center mechanism housing 13, and the second center mechanism housing 14 are substantially cylindrical shaped with a hollow channel in a center that penetrates in the front-rear direction. The rear mechanism housing 15 is plate-shaped with the front-rear direction as a plate thickness direction. The front mechanism housing 12, the first center mechanism housing 13, the second center mechanism housing 14, and the rear mechanism housing 15 form a mechanism housing. The mechanism housing houses a gear shaft 23, an idle gear 24, and a nut 26, which will be described later.

Figure 3:
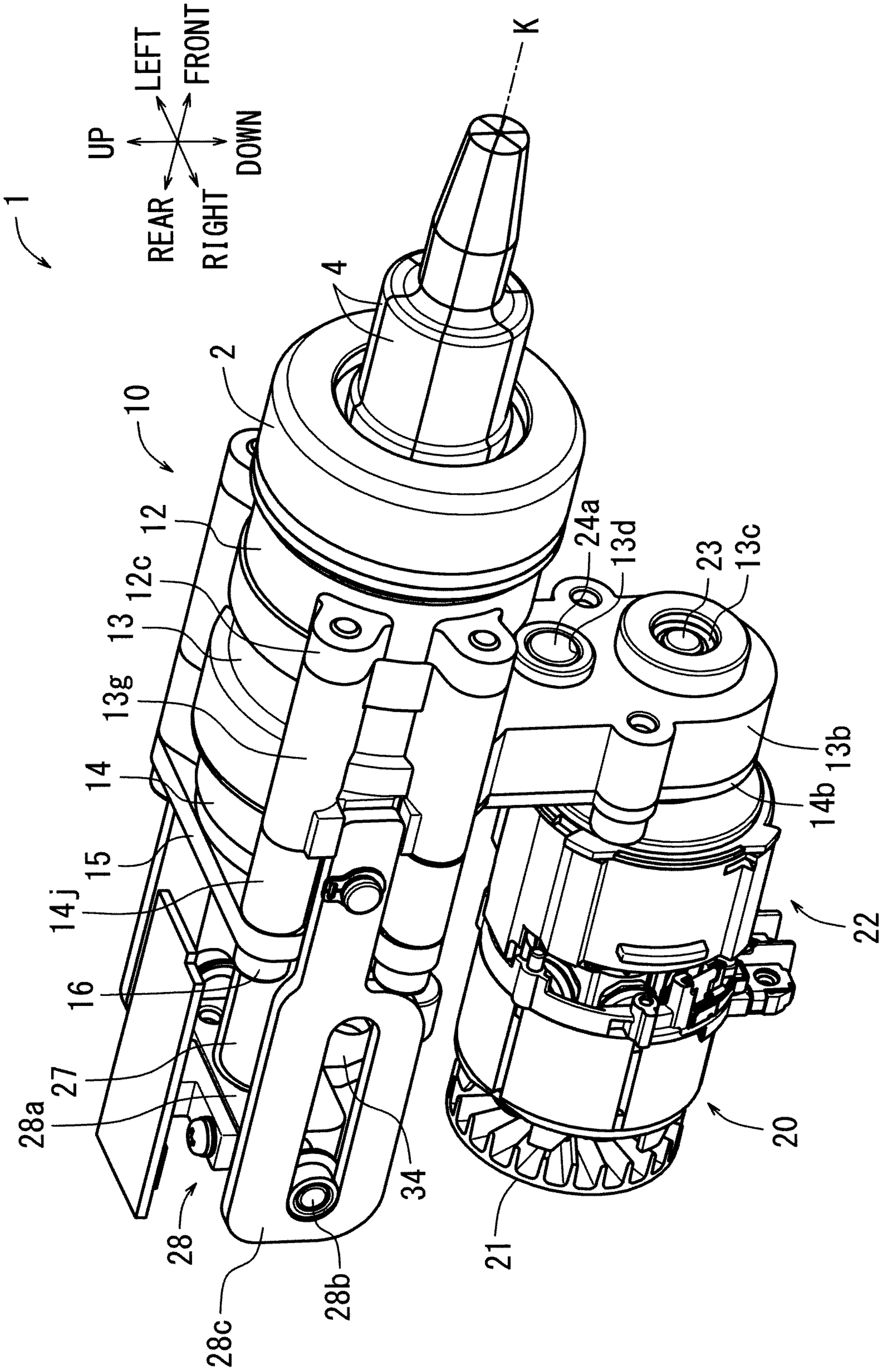
FIG. 3 is a perspective view of a tool body with a body housing removed as viewed from a front right side.

As shown in FIGS. 3 and 4, a male thread 12*a* is provided on a front outer circumferential surface of the front mechanism housing 12. A female thread 2*b* threadedly coupled to the male thread 12*a* is provided on a rear inner circumferential surface of cap 2. The cap 2 connects to a front part of the front mechanism housing 12 by screwing the male thread 12*a* and the female thread 2*b* together.

As shown in FIGS. 3 and 4, the outer circumferential surface of the front mechanism housing 12 is provided with four substantially cylindrical boss sections 12*c* that protrude radially outward. The boss sections 12*c* are formed with threaded holes 12*d* that penetrate in the front-rear direction. The first center mechanism housing 13 and the second center mechanism housing 14 have four substantially cylindrical boss sections 13*g* and 14*j*, respectively, protruding radially outward. Each of the boss sections 13*g*, 14*j* has a through hole 13*h*, 14*k* that penetrates in the front-rear direction. Four corners of the rear mechanism housing 15 have through holes 15*b* that penetrate in the front-rear direction. By aligning the boss sections 12*c*, 13*g*, 14*j* and the thorough holes 15*b* in the front-rear direction, the threaded holes 12*d* and the through holes 13*h*, 14*k*, 15*b* connect together in the front-rear direction. Four bolts 16 are inserted from rear to front through the through holes 15*b*, 14*k*, 13*h*, respectively, and fastened into the threaded holes 12*d*. The front mechanism housing 12, the first center mechanism housing 13, the second center mechanism housing 14, and the rear mechanism housing 15 are then connected in alignment in the front-rear direction.

As shown in FIGS. 3 and 4, the first center mechanism housing 13 has a downwardly extending portion 13*b* having a substantially U-shaped contour extending downwardly from a cylindrical shape. The second center mechanism housing 14 has a downwardly extending portion 14*b* having a substantially U-shaped contour extending downwardly from a cylindrical shape. The downwardly extending portion 13*b* and the downwardly extending portion 14*b* are connected in the front-rear direction to form a space to accommodate the gear shaft 23 and the idle gear 24. The downwardly extending portion 13*b* is provided with two through holes arranged in parallel one above the other and penetrating in the front-rear direction. The lower through hole is provided with a recess 13*c* for supporting the gear shaft 23, which will be described below. A shaft member 24*a* supporting the idle gear 24 is press-fitted into the upper through hole 13*d*. The downwardly extending portion 14*b* has two through holes arranged in parallel one above the other and penetrating in the front-rear direction. The lower through hole has a recess 14*c* for supporting the gear shaft 23. The shaft member 24*a* is inserted into the upper through hole 14*d*.

As shown in FIGS. 3 and 12, a substantially columnar electric motor 20 is accommodated in a lower rear portion of the body housing 11. For example, a motor known as a DC brushless motor may be used for the electric motor 20. The electric motor 20 is located below the output shaft 27 located at the rear end position and above the grip 5. The electric motor 20 overlaps the output shaft 27 located at the rear end position by more than or equal to 80% of its axial (front-back) length. In this embodiment, the entire axial length of the electric motor 20 overlaps with the output shaft 27, which is located at the rear end position. A motor shaft 20*a* of the electric motor 20 extends in the front-rear direction parallel to the output axis K, which penetrating the center of the output shaft 27 along a motor axis J. The motor axis J is aligned in parallel one above the other with the output axis K on an imaginary plane S that extends in the up-down direction (see FIG. 13). The motor shaft 20*a* is rotatably supported around the motor axis J by bearings 20*e* and 20*f*. The bearing 20*e* is provided between the electric motor 20 and a planetary reduction mechanism 22, which will be described later. The bearing 20*f* is supported on an inner wall of a rear side of the body housing 11.

As shown in FIG. 12, the electric motor 20 has a stator 20*b* supported non-rotatably against the body housing 11. The stator 20*b* is disposed radially outward from the motor shaft 20*a*. A rotor 20*c* of the electric motor 20 is mounted on the motor shaft 20*a* so as to be integrally rotatable with the motor shaft 20*a* on an inner circumferential side of the stator 20*b*. A rotation speed detection sensor 20*d* is provided in front of the rotor 20*c*. The rotation speed detection sensor 20*d* detects the rotation speed of the motor shaft 20*a* by detecting a rotation angle of the rotor 20*c*. A fan 21 is integrally mounted on the motor shaft 20*a* for cooling air flowing into the electric motor 20 between the rotor 20*c* and the rear bearing 20*f* in the front-rear direction. When the fan 21 and the motor shaft 20*a* rotate, cooling air flows from the front to the rear of the electric motor 20.

As shown in FIG. 12, a planetary reduction mechanism (transmission mechanism) 22 is provided in front of the electric motor 20 to reduce the output of the motor shaft 20*a*. The planetary reduction mechanism 22 has a substantially columnar shape centered on the motor axis J and has approximately the same diameter as the electric motor 20. The planetary mechanism 22 is accommodated in the body housing 11 aligned with the electric motor 20 in the front-rear direction. A first sun gear 22*a* of the planetary reduction mechanism 22 is integrally provided with the front end of the motor shaft 20*a* in front of the bearing 20*e*. A ring-shaped first internal gear 22*b* centered on the motor axis J is provided radially outward from the first sun gear 22*a*. A plurality of first planetary gears 22*c* mesh between the first sun gear 22*a* and the first internal gear 22*b*. The first planetary gear 22*c* connects a first carrier 22*d* in front of the first sun gear 22*a*. The rotary drive of the motor shaft 20*a* is transmitted at reduced speed to the first carrier 22*d* via the first sun gear 22*a* and the first planetary gear 22*c*.

As shown in FIG. 12, the first carrier 22*d* is integrally provided with a second sun gear 22*e* at the front and is rotatable about the motor axis J together with the second sun gear 22*e*. A ring-shaped second internal gear 22*f* centered on the motor axis J is provided radially outward from the second sun gear 22*e*. A plurality of second planetary gears 22*g* mesh between the second sun gear 22*e* and the second internal gear 22*f*. The second planetary gears 22*g* are connected to a second carrier 22*h* disposed in front of the second sun gear 22*e*. The second carrier 22*h* is provided integrally with the rear end of the front gear shaft 23 and is rotatable about the motor axis J. Therefore, the rotary drive of the first carrier 22*d* is transmitted at reduced speed to the gear shaft 23 via the second sun gear 22*e*, the second planetary gear 22*g*, and the second carrier 22*h*. Thus, the rotary drive of the motor shaft 20*a* is transmitted at reduced speed to the gear shaft 23 via the planetary reduction mechanism 22.

As shown in FIG. 12, the gear shaft 23 is rotatably supported about the motor axis J by bearings 23*b* and 23*c*. The front bearing 23*b* is press-fitted into the recess 13*c* recessed in the lower part of the first center mechanism housing 13. The rear bearing 23*c* is press-fitted into the recess 14*c* recessed in the lower part of the second center mechanism housing 14. The gear shaft 23 has a drive-side gear 23*a* between the bearings 23*b* and 23*c* in the front-rear direction. The drive-side gear 23*a* integrally rotates about the motor axis J with the gear shaft 23.

As shown in FIG. 12, an idle gear 24 is provided between the gear shaft 23 and the output shaft 27 in the up-down direction. The idle gear 24 is rotatably supported about an axis of the shaft member 24*a* by a columnar shaft member 24*a* extending in the front-rear direction. The shaft member 24*a* is inserted into the through-hole 13*d* provided in the downwardly extending portion 13*b* of the first center mechanism housing 13 and the through-hole 14*d* provided in the downwardly extending portion 14*b* of the second center mechanism housing 14. The axis of the shaft member 24*a* is located on an imaginary plane S that includes the motor axis J and the output axis K (see FIG. 9). A radial bearing 24*b* is in between the shaft member 24*a* and the idle gear 24 in the radial direction. The idle gear 24 meshes with a lower drive-side gear 23*a* and with an upper driven-side gear 26*a*.

As shown in FIG. 12, the tool body 10 is provided with a feed screw mechanism (power conversion mechanism) 25, which is referred to as a ball screw mechanism. The feed screw mechanism 25 includes an output shaft 27 and a nut 26. A male thread 27*a* is provided on an outer circumferential surface of the output shaft 27. Therefore, the output shaft 27 corresponds to a threaded shaft of the ball screw mechanism. The nut 26 is formed in a substantially cylindrical shape that circumferentially covers the output shaft 27. A female thread 26*b* is provided on an inner circumferential surface of the nut 26. The female thread 26*b* is threadedly coupled to the male thread 27*a* of the output shaft 27 via a plurality of balls 27*b* interposed therebetween. A driven-side gear 26*a* is provided on an outer circumference of the nut 26, which protrudes radially outward and meshes with idle gear 24. The drive-side gear 23*a* meshes with the idle gear 24 and the idle gear 24 meshes with the driven-side gear 26*a*, thereby transmitting the rotational drive of the gear shaft 23 to the nut 26 at reduced speed.

As shown in FIG. 12, the nut 26 is rotatably supported about the output axis K by the bearings 26*c* and 26*d* housed in the tool body 10. The front bearing 26*c* is press-fitted into the inner circumferential surface 13*a* of the first center mechanism housing 13. The rear bearing 26*d* is press-fitted into the inner circumferential surface 14*a* of the second center mechanism housing 14. A thrust bearing 26*e* to receive a thrust load for pushing the nut 26 forward is provided between a rear side of the nut 26 and a front side 15*a* of the rear mechanism housing 15.

Figure 5:
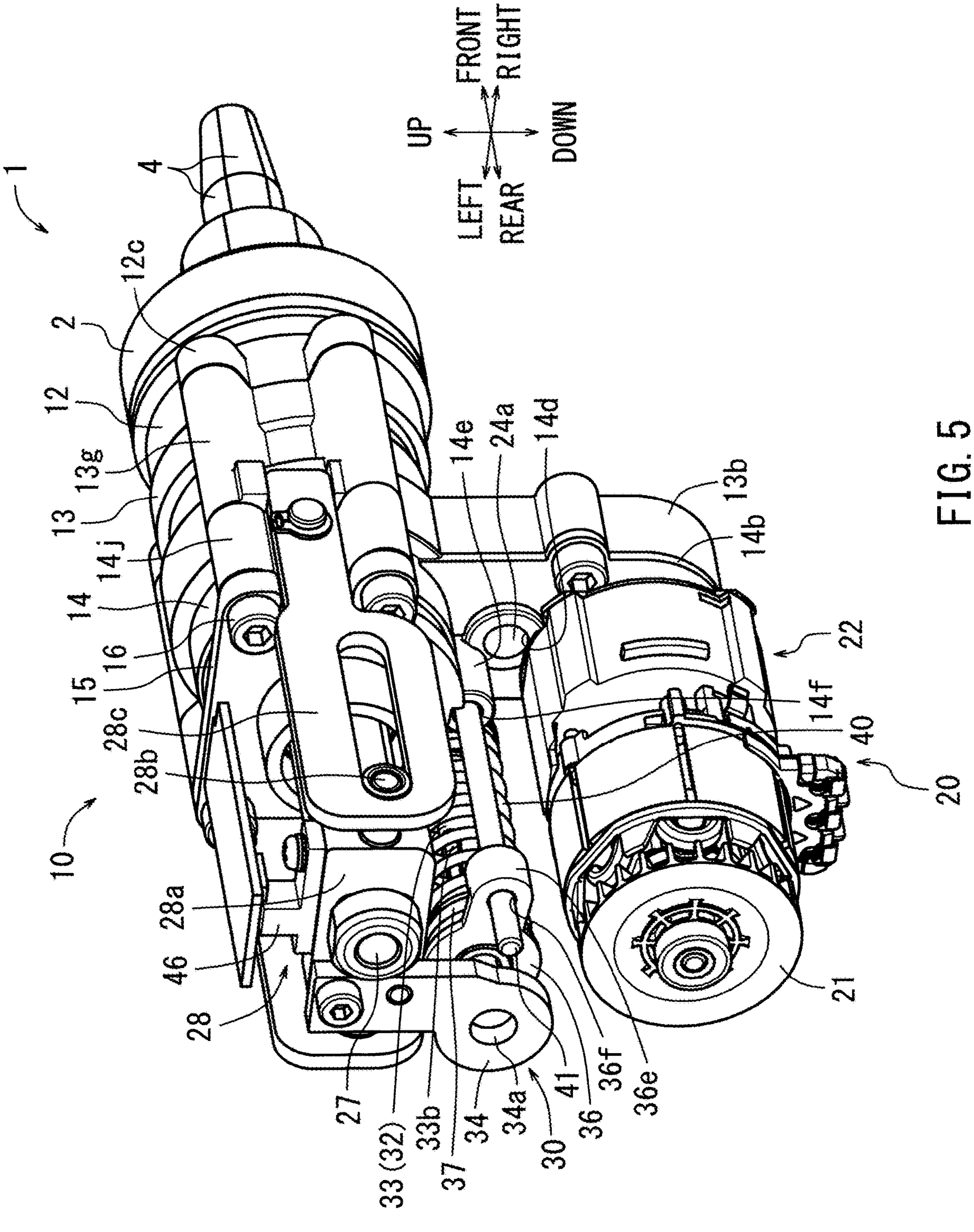
FIG. 5 is a perspective view of the tool body with the body housing removed as viewed from a rear right side.

As shown in FIGS. 3 and 5, an output shaft guide 28 is attached to a rear of the output shaft 27 to prevent the output shaft 27 from rotating and to guide the back-and-forth movement of the output shaft 27. The output shaft guide 28 has a roller shaft 28*a* that connects the rear end of the output shaft 27 and extends in the left-right direction. The output shaft guide 28 has a pair of rollers 28*b* at both left and right ends of the roller shaft 28*a*. A pair of loop-shaped rails 28*c* extending in the front-rear direction are mounted on left and right sides of the second center mechanism housing 14. The rollers 28*b* engage the rails 28*c* and is movable in the front-rear direction along the rails 28*c*. The output shaft 27 is guided by the rollers 28*b* and moves in the front-rear direction together with the output shaft guide 28.

Figure 6:
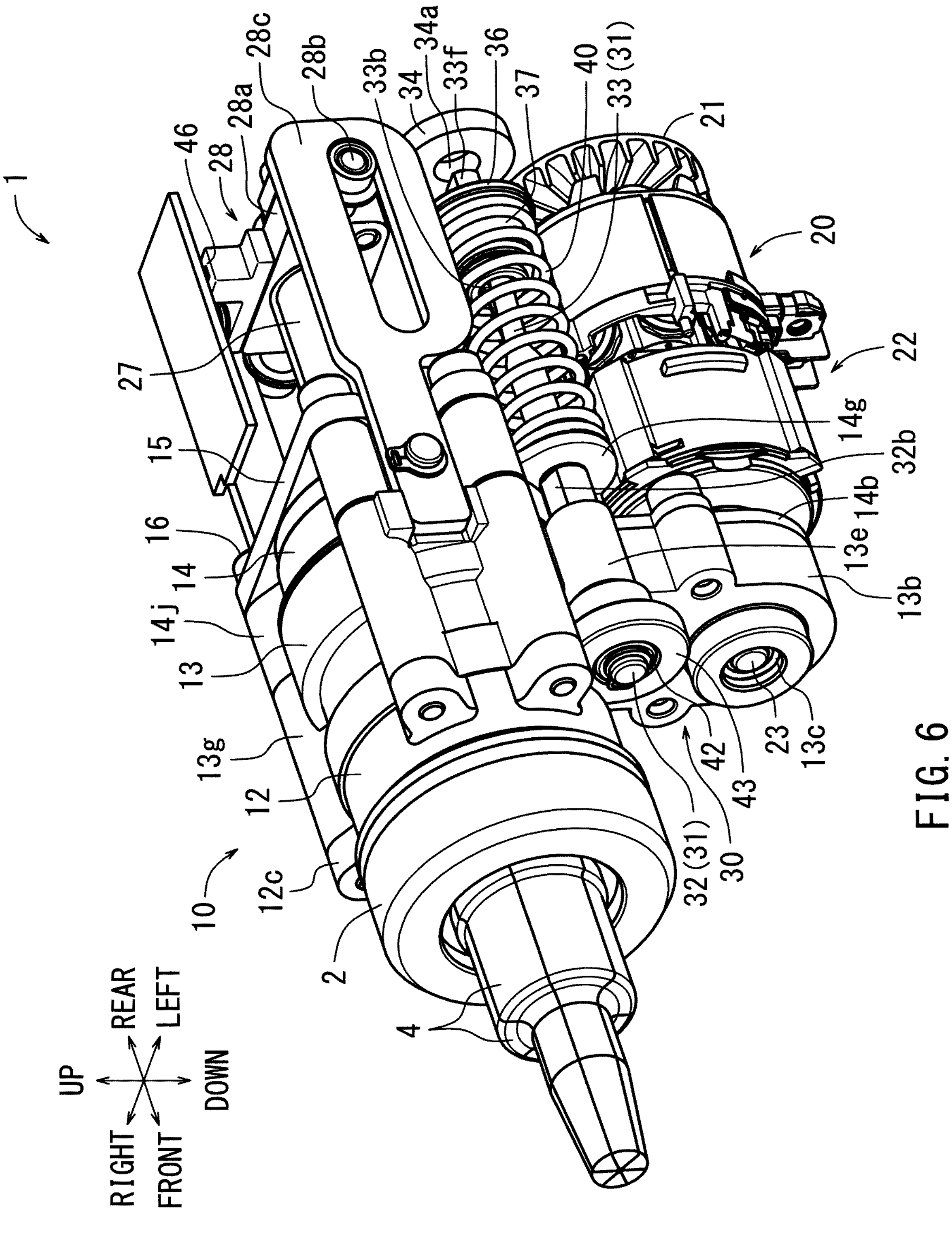
FIG. 6 is a perspective view of the tool body with the body housing removed as viewed from a front left side.

As shown in FIGS. 6 and 12, the tool body 10 has a jaw rotation mechanism 30 to rotate the plurality of jaws 4. The plurality of jaws 4 rotates about the output axis K. The jaw rotation mechanism 30 has a push plate 34 that moves back-and-forth in conjunction with a rotation of the motor shaft 20*a* and a shaft 31 that rotates in conjunction with the back-and-forth movement of the push plate 34. The shaft 31 is disposed on a shaft axis L extending in the front-rear direction. The shaft 31 rotates about the shaft axis L. The shaft axis L is located below the output axis K and above the motor axis J in the up-down direction. The shaft axis L is offset to the left from the imaginary plane S that includes the output axis K and the motor axis J in the left-right direction (see FIG. 13). The shaft 31 of the jaw rotation mechanism 30 partially overlaps the idle gear 24 in the up-down direction. The shaft 31 overlaps the output shaft 27 located at the rear end position by more than or equal to 80% of its axial (front-back) length. In this embodiment, the shaft 31 overlaps the entire axial length with respect to the output shaft 27 located at the rear end position.

Figure 14:
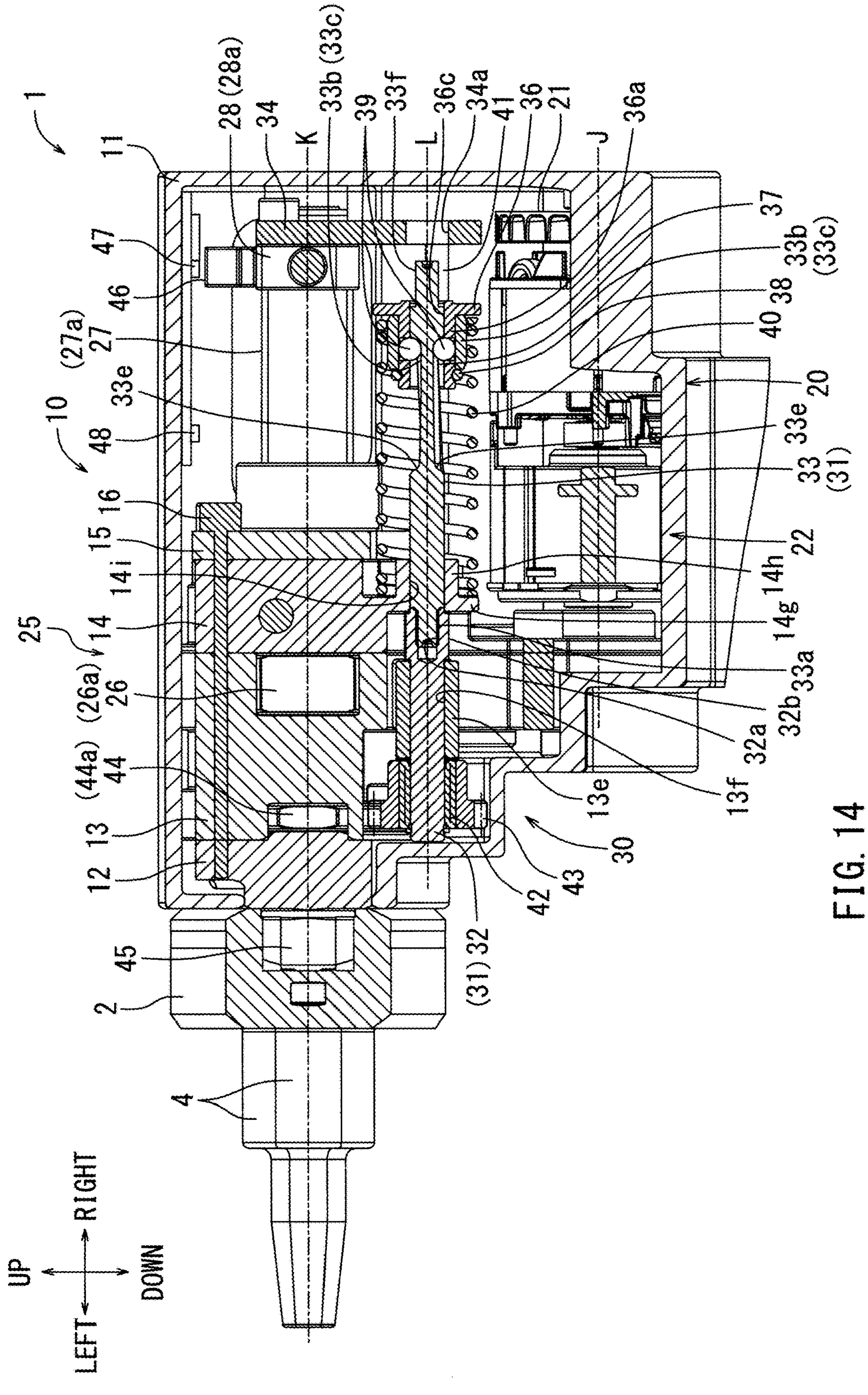
FIG. 14 is a cross-sectional view taken along a line XIV-XIV in FIG. 13 when the output shaft is located at the rear end position.

As shown in FIGS. 5 and 14, the jaw rotation mechanism 30 has a ball retainer 36 mounted on the shaft 31. The ball retainer 36 is movable in the front-rear direction along the shaft axis L. A guide shaft 41 extending parallel to the shaft 31 is provided to the right of the shaft 31. The second center mechanism housing 14 has a guide shaft support 14*e* below the output shaft 27 and above the planetary reduction mechanism 22. The guide shaft support 14*e* has a through-hole 14*f* that penetrates in the front-rear direction. The guide shaft 41 is press-fitted into the through hole 14*f* and secured to the second center mechanism housing 14.

Figure 10:
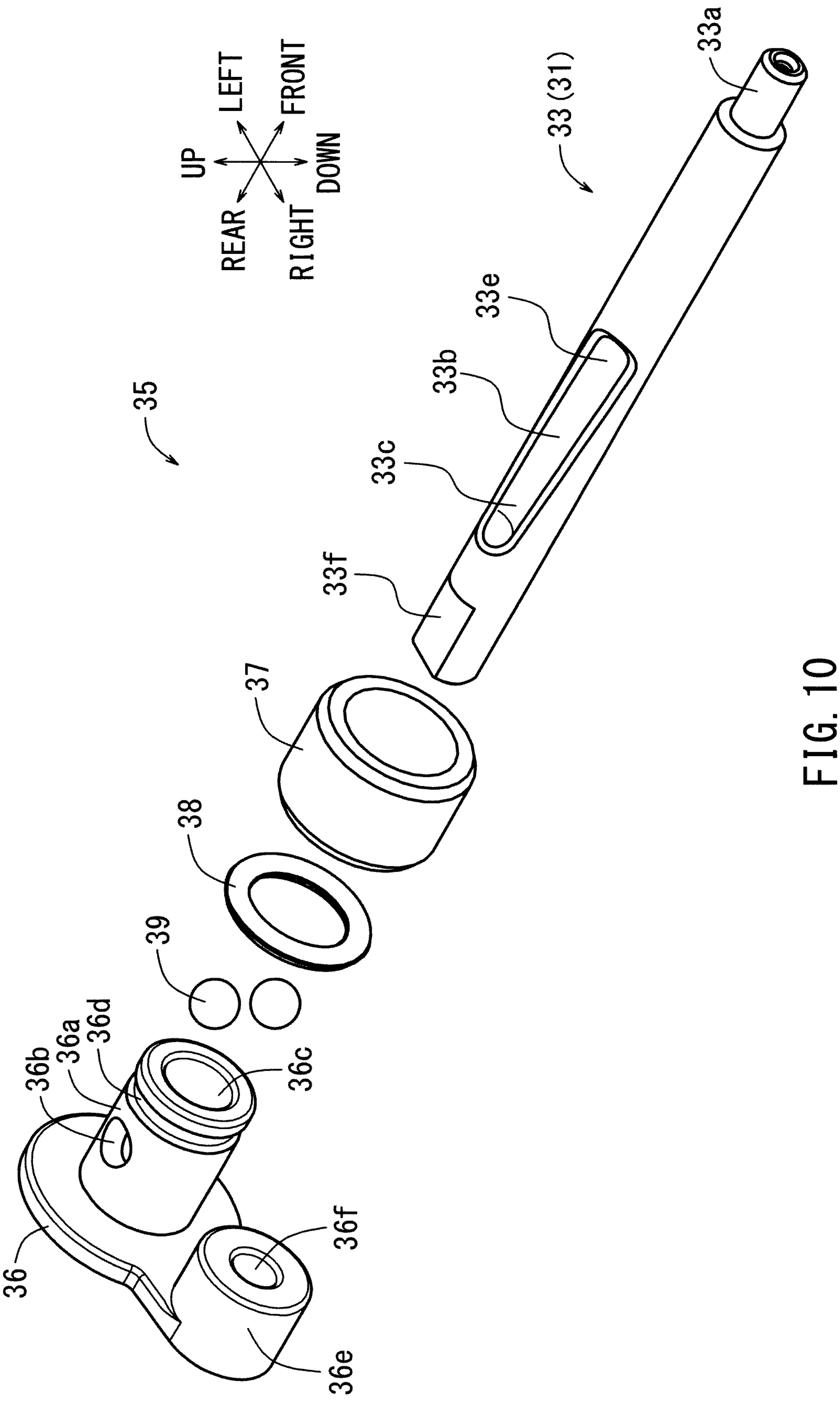
FIG. 10 is an exploded perspective view of an assembly including a rear shaft.

As shown in FIGS. 5 and 10, the ball retainer 36 has a substantially cylindrical sleeve attachment portion 36*a* and a laterally extending portion 36*e* that extends to the right of the sleeve attachment portion 36*a*. A shaft insertion hole 36*c* penetrating in the front-rear direction is provided in a center of the sleeve attachment portion 36*a*. A shaft 31 is slidably inserted into the shaft insertion hole 36*c* with respect to the ball retainer 36. The laterally extending portion 36*e* is provided with a through-hole 36*f* that penetrates in the front-rear direction. A guide shaft 41 is slidably inserted into the through-hole 36*f* with respect to the ball retainer 36. Thus, the ball retainer 36 is guided by the shaft 31 and the guide shaft 41 so as to be slidable in the front-rear direction, and is restricted from rotating about the axis of the shaft 31.

As shown in FIGS. 5 and 14, the jaw rotation mechanism 30 has a push plate 34 that pushes the ball retainer 36 from the rear. The plate-shaped push plate 34 is integrally attached to the roller shaft 28*a* in a posture with the plate thickness direction determined as the front-rear direction. The push plate 34 extends downward from the roller shaft 28*a* and is disposed behind the sleeve attachment portion 36*a*. The push plate 34 has a through-hole 34*a* that penetrates in the front-rear direction. The shaft 31 protruding rearward from the sleeve attachment portion 36*a* can penetrate the through-hole 34*a*. The push plate 34 presses the rear side of the ball retainer 36 forward as it moves forward with the output shaft 27. The push plate 34 moves away from the ball retainer 36 when it moves rearward with the output shaft 27. Therefore, the force of the push plate 34 to move the ball retainer 36 is not exerted.

As shown in FIGS. 10 and 14, the sleeve attachment portion 36*a* is provided with a ball retaining hole 36*b* that penetrates in the up-down direction to communicate with the shaft insertion hole 36*c*. A ball 39 is inserted into the pair of ball retaining holes 36*b*, respectively, which are located above and below the shaft insertion hole 36*c*. A sleeve 37 covering the ball retaining holes 36*b* from radially outward is mounted on the sleeve attachment portion 36*a*. The sleeve 37 is attached to the sleeve attachment portion 36*a* to retain the ball 39 in the ball retaining hole 36*c*. A recessed groove 36*d* extending in the circumferential direction is provided at a front part of the sleeve attachment portion 36*a*. An O-ring 38 is attached in the recessed groove 36*d* to prevent the sleeve 37 from falling out of the sleeve attachment portion 36*a*.

Figure 15:
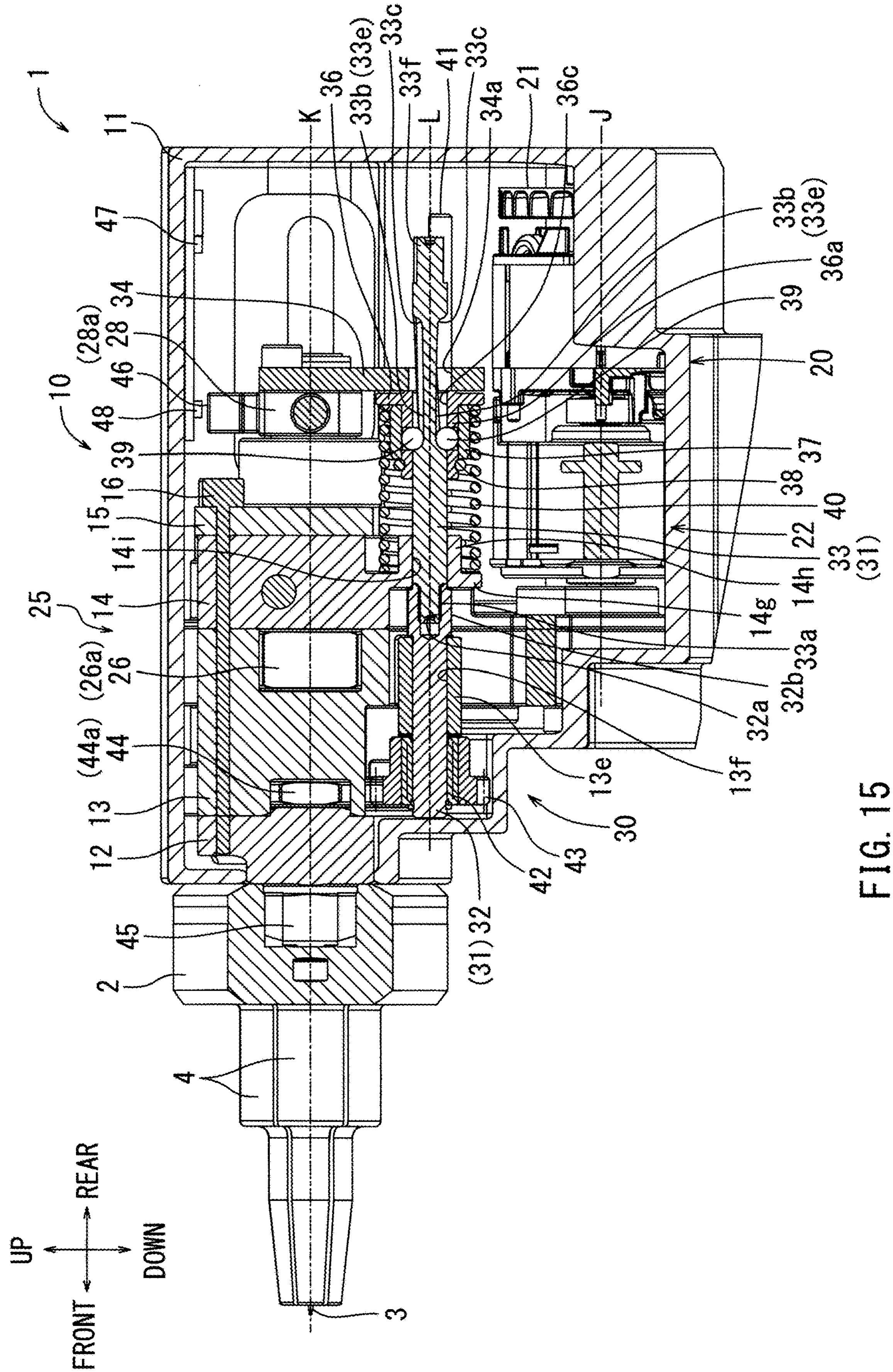
FIG. 15 is a cross-sectional view taken along a line XIV-XIV in FIG. 13 when the output shaft is located at the front end position.

As shown in FIGS. 14 and 15, the shaft 31 is composed by assembling a front shaft 32 and a rear shaft 33 in the front-rear direction. The front shaft 32 is supported to the first center mechanism housing 13 and the second center mechanism housing 14 so as to be rotatable about the axis. The rear shaft 33 is supported to the second center mechanism housing 14 so as to be rotatable about the axis. The rear shaft 33 is inserted into the ball retainer 36. A male thread 33*a* is provided at a front end of the rear shaft 33. The front shaft 32 is provided with a female thread 32*a* that is threadedly coupled to the male thread 33*a*. The male thread 33*a* is threadedly coupled to the female thread 32*a* so that the rear shaft 33 is integrally attached to the front shaft 33. By rotating the rear shaft 33 in a clockwise direction (in a direction of a first rotation R1 shown in FIG. 8) when viewed from behind with respect to the front shaft 32, the male thread 33*a* and the female thread 32*a* are mutually fastened. By rotating the rear shaft 33 in a counterclockwise direction (in a direction of a second rotation R2 shown in FIG. 7) when viewed from behind with respect to the front shaft 32, the male thread 33*a* and female thread 32*a* are loosened from each other.

As shown in FIGS. 10, 14, and 15, a pair of ball grooves 33*b* are provided on the outer circumferential surface of the rear shaft 33. The ball grooves 33*b* extend substantially in the longitudinal direction of the rear shaft 33 and in the circumferential direction like threaded grooves from the rear to the front. The ball grooves 33*b* extend in the direction of the first rotation R1 (see FIG. 8) from a rear part 33*c* to a front part 33*e*. The pair of ball grooves 33*b* are disposed in a point-symmetrical positional relationship with respect to the axial center of the rear shaft 33. A ball 39 protrudes radially inward from the ball retaining hole 36*b* of the ball retainer 36 into the shaft insertion hole 36*c* and engages in the ball groove 33*b*.

As shown in FIG. 14 and FIG. 15, the ball 39 moves in the ball groove 33*b* along an extending direction of the ball groove 33*b*. When the ball retainer 36 holds the ball 39, the rotation around the shaft axis L is restricted. When the ball retainer 36 moves forward with respect to the rear shaft 33, the ball 39 moves from the rear part 33*c* to the front part 33*e* of the ball groove 33*b*. The rear shaft 33 therefore rotates in the direction of the second rotation R2 (see FIG. 7) with respect to the ball retainer 36. When the ball retainer 36 moves rearward with respect to the rear shaft 33, the ball 39 moves from the front part 33*e* to the rear part 33*c* of the ball groove 33*b*. The rear shaft 33 therefore rotates in the direction of the first rotation R1 (see FIG. 8) with respect to the ball retainer 36.

As shown in FIGS. 14 and 15, the second center mechanism housing 14 has a shaft support 14*h* that supports the threadedly coupled region of the front shaft 32 and the rear shaft 33. The shaft support 14*h* has a ribbed spring receiving portion 14*g* that protrudes in the radial direction and a through-hole 14*i* for inserting the shaft 31 in the front-rear direction. A compression spring 40 is interposed between the spring receiving portion 14*g* and the ball retainer 36 in the front-rear direction. The rear shaft 33 inserts through a center of the compression spring 40. The compression spring 40 biases the ball retainer 36 rearward.

As shown in FIGS. 14 and 15, the first center mechanism housing 13 has a shaft support 13*e* that supports the front shaft 32. A through hole 13*f* is provided in the center of the shaft support 13*e*, through which the front shaft 32 can be inserted in the front-rear direction.

As shown in FIGS. 14 and 15, the jaw rotation mechanism 30 has a cylindrical one-way clutch 42 and a drive-side gear 43. The one-way clutch 42 and the drive-side gear 43 are mounted on the front part of the front shaft 32 in front of the shaft support 13*e*. The one-way clutch 42 is provided between the front shaft 32 and the drive-side gear 43 in the radial direction. The one-way clutch 42 may have a structure, for example, referred to as a sprag-type structure, and transmits only one-way rotation on the radially inner circumferential side to the radially outer circumferential side. The one-way clutch 42 transmits the first rotation R1 (see FIG. 8) of the front shaft 32 to the drive-side gear 43. The one-way clutch 42 does not transmit the second rotation R2 (see FIG. 7) of the front shaft 32 to the drive-side gear 43 and idles the front shaft 32.

Figure 11:
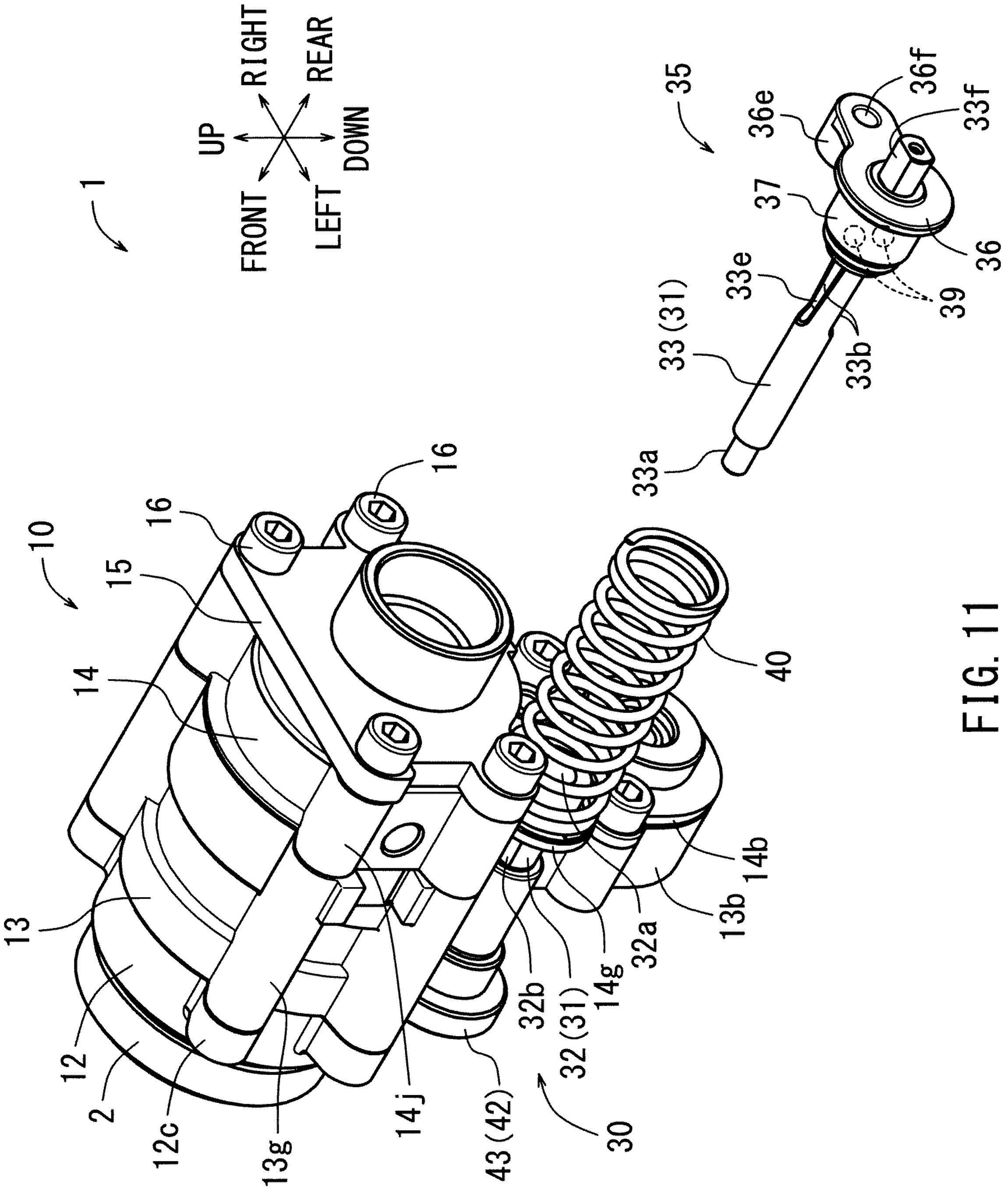
FIG. 11 is a perspective view of the assembly including the tool body and the rear shaft.

As shown in FIG. 11, the rear shaft 33, the ball retainer 36, the ball 39, and the sleeve 37 may be integrally assembled as an assembly 35. The assembly 35 may be assembled to the tool body 10 by screwing the male thread 33*a* of the rear shaft 33 with the female thread 32*a* of the front shaft 32. When the assembly 35 is assembled to the tool body 10, the compression spring 40 is compressed by the assembly 35 to be assembled.

Figure 7:
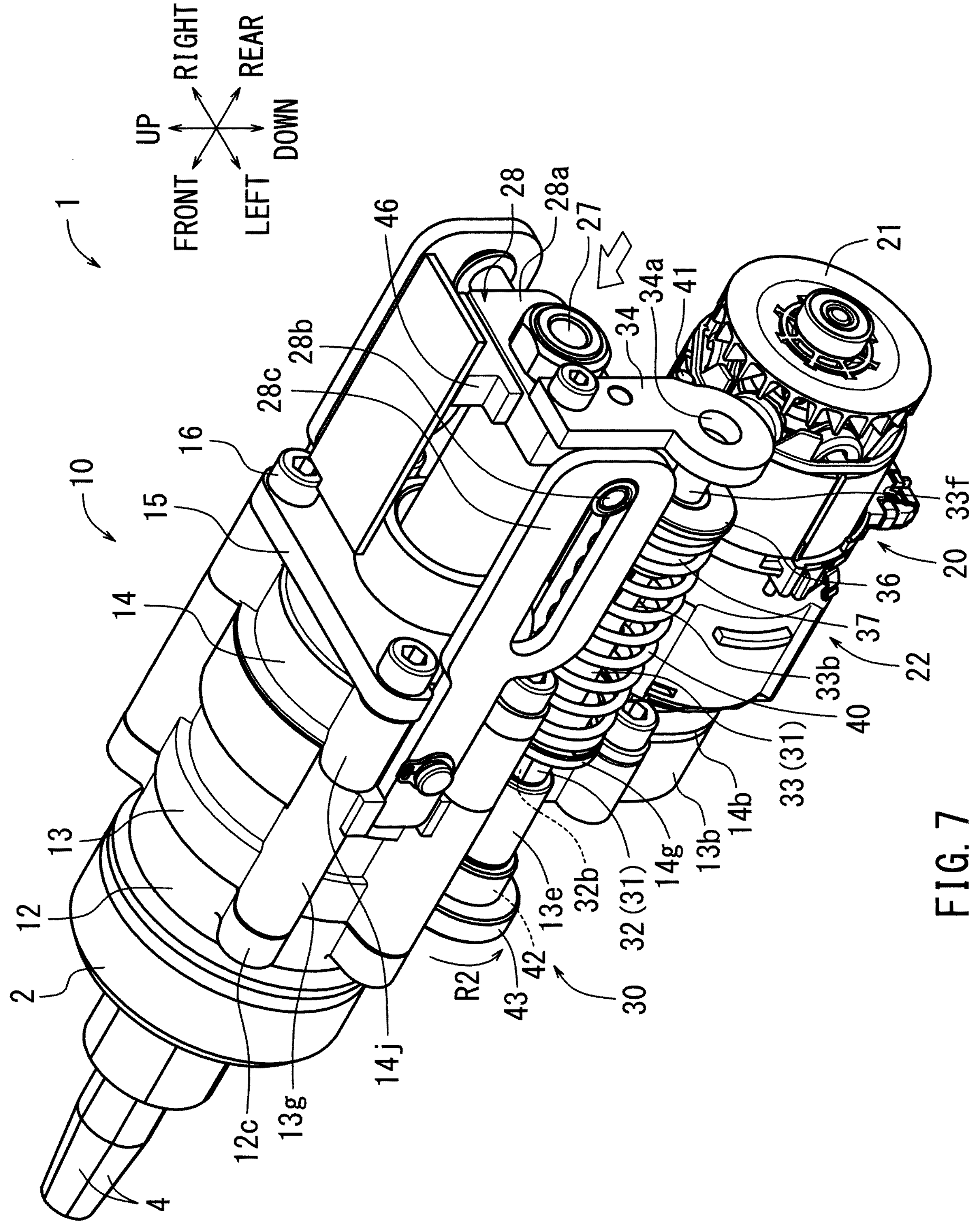
FIG. 7 is a perspective view of the tool body with the body housing removed as viewed from a rear left side, showing an output shaft located at a rear end position.
Figure 8:
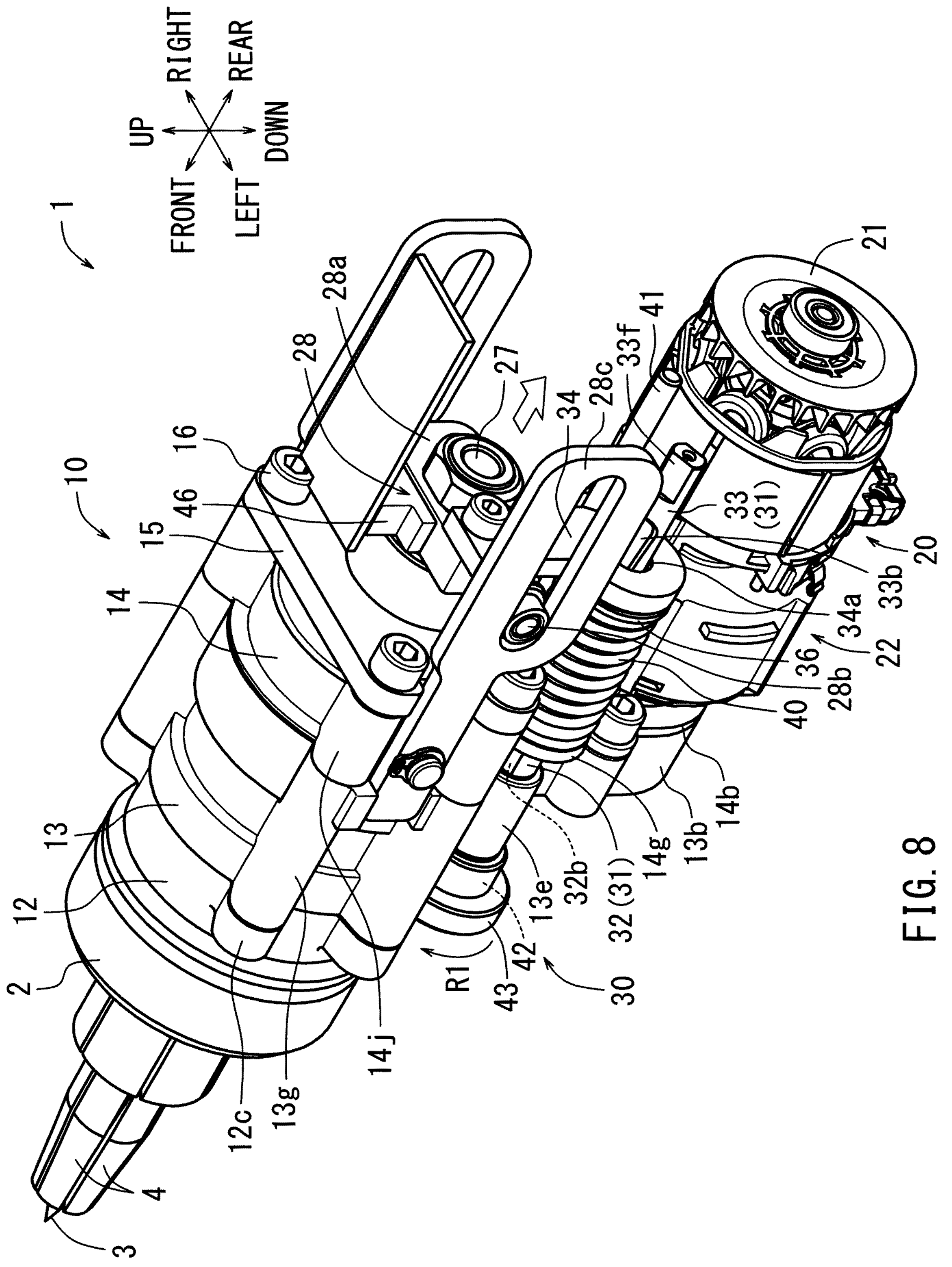
FIG. 8 is a perspective view of the tool body with the body housing removed as viewed from the rear left side, showing the output shaft located at a front end position.
Figure 9:
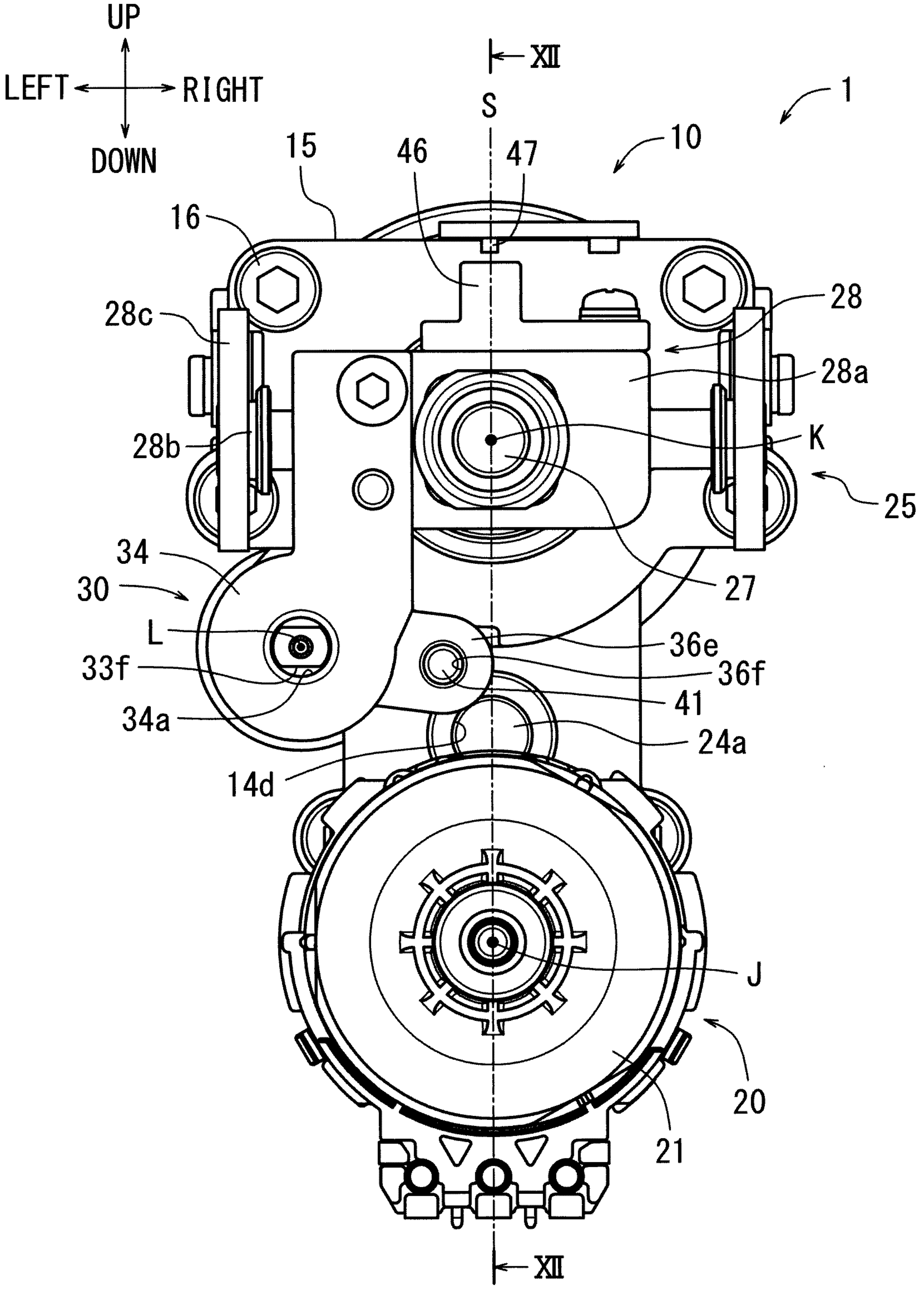
FIG. 9 is a rear view of the tool body with the body housing removed.

As shown in FIGS. 7, 8, and 11, the rear part of the front shaft 32 is provided with a two-sided flat portion 32*b* having a pair of planes extending parallel to each other in the front-rear direction. The two-sided flat portions 32*b* are exposed to the outside of the mechanism housing between the first center mechanism housing 13 and the second center mechanism housing 14. The rear end of the rear shaft 33 is provided with a two-sided flat portion 33*f* having a pair of planes extending parallel to each other in the front-rear direction. While holding the two-sided flat portion 32*b* with a spanner or the like to prevent the front shaft 32 from rotating, the rear shaft 33 is rotated in the direction of the first rotation R1 with the two-sided flat portion 33*f* held by a spanner or the like. As a result, the rear shaft 33 is threadedly coupled to the front shaft 32. Thus, the assembly 35 having the rear shaft 33 can be integrally assembled to the tool body 10 that supports the front shaft 32.

As shown in FIGS. 4, 12, 16, and 17, the jaw rotation mechanism 30 has a substantially cylindrical rotary drive ring 44 and a substantially cylindrical joint 45. The rotary drive ring 44 and the joint 45 are supported on the radially inner side of the inner circumferential surface 12*b* of the front mechanism housing 12 and axially rotate about the output axis K. An O-ring 45*d* is provided between the joint 45 and the front mechanism housing 12 in the radial direction. In the center of the rotary drive ring 44, an insertion hole 44*b* is provided through which the output shaft 27 can be inserted through in the front-rear direction. On the rear outer circumference of the rotary drive ring 44, a driven-side gear 44*a* protruding radially outward is provided. The driven-side gear 44*a* meshes with the drive-side gear 43. The rotational power of the drive-side gear 43 is transmitted to the driven gear 44*a* at reduced speed. A plurality of engagement protrusions 44*c* protruding forward and aligned in the circumferential direction are provided at the front end of the rotary drive ring 44.

Figure 16:
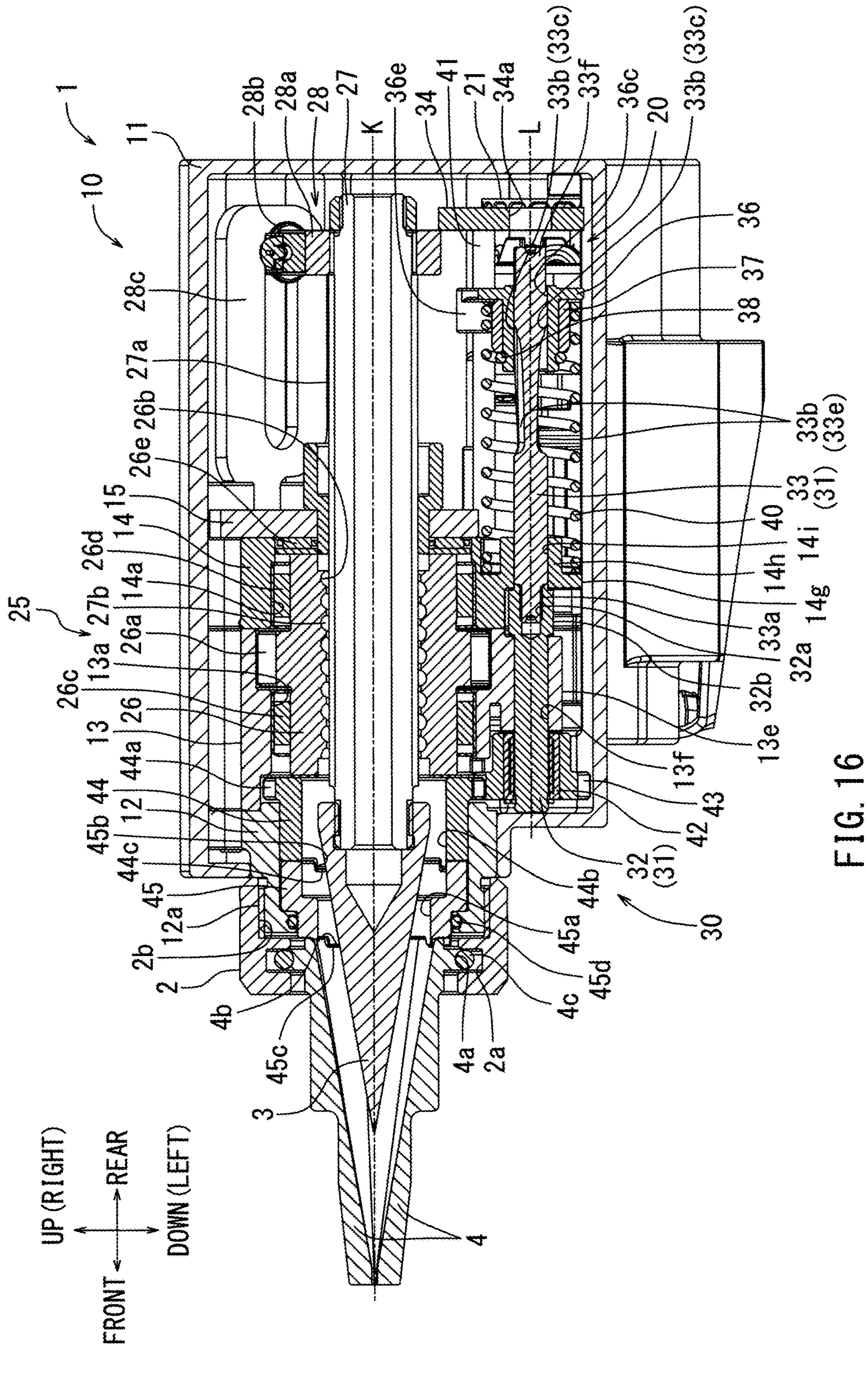
FIG. 16 is a cross-sectional view taken along a line XVI-XVI in FIG. 13 when the output shaft is located at the rear end position.
Figure 17:
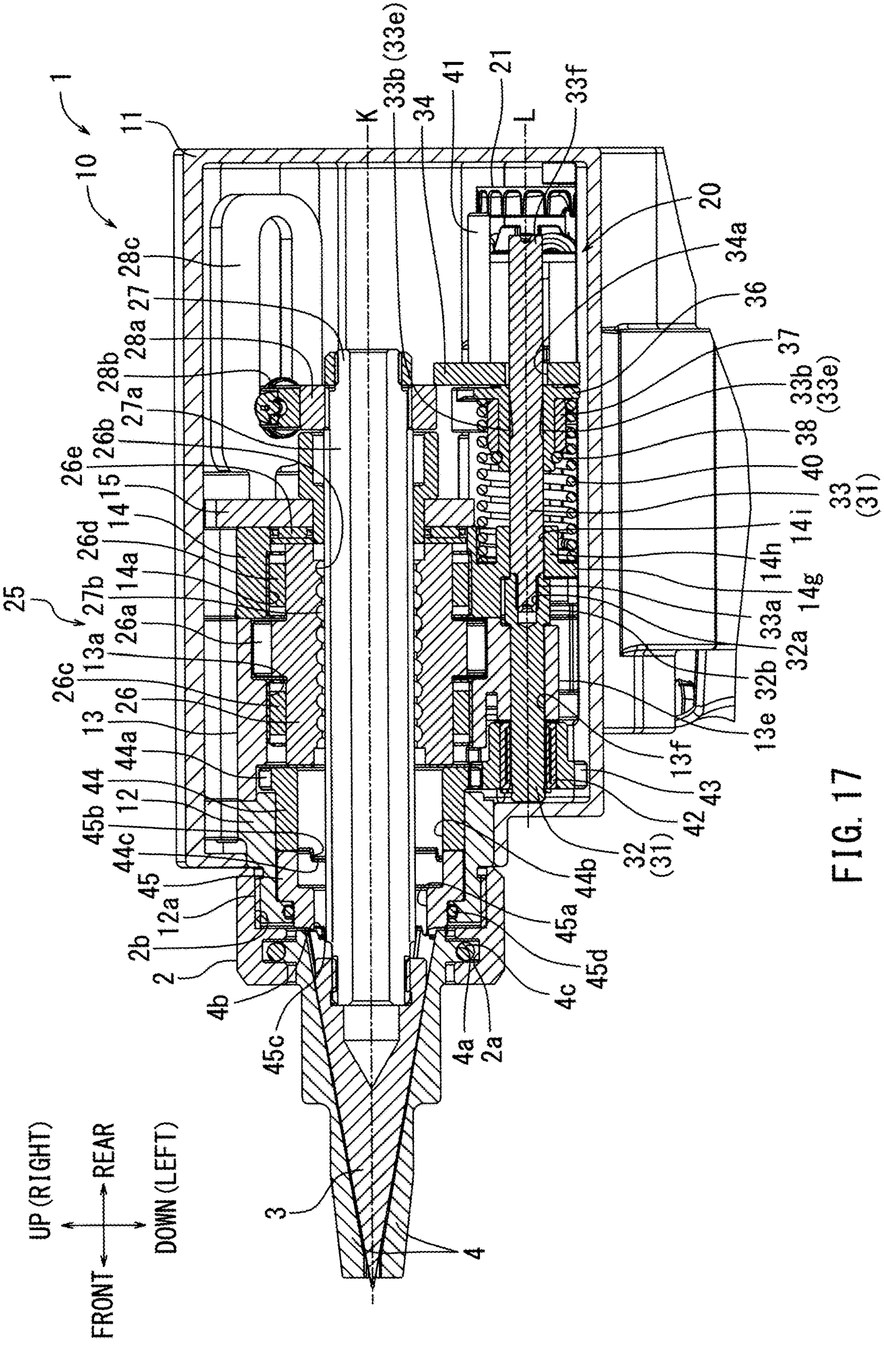
FIG. 17 is a cross-sectional view taken along the line XVI-XVI in FIG. 13 when the output shaft is located at the front end position.

As shown in FIGS. 4, 16, and 17, an insertion hole 45*a* is provided in the center of the joint 45, through which the output shaft 27 can be inserted through in the front-rear direction. At the rear end of the joint 45, a plurality of engagement recesses 45*b* are provided, which engage a plurality of engagement projections 44*c* of the rotary drive ring 44. The engagement protrusions 44*c* are fitted into the engagement recesses 45*b* to cause the joint 45 to rotate integrally with the rotary drive ring 44. A plurality of engagement protrusions 45*c* protruding forward and aligned in the circumferential direction are provided at the front end of the joint 45.

As shown in FIGS. 4, 16 and 17, the rear end of the jaws 4 is provided with an engagement recess 4*b* that engages the plurality of engagement protrusions 45*c* of the joint 45. The plurality of engagement protrusions 45*c* are fitted into the engaging recess 4*b* of each jaw 4 to cause the jaws 4 to rotate around the output axis K integrally with the joint 45. An arc-shaped ring housing groove 4*a* in cross section is provided on the radially outer circumference of the rear part of the jaws 4. The ring housing grooves 4*a* of the plurality of jaws 4 are connected circumferentially to form a ring-shaped groove. The plurality of jaws 4 are connected circumferentially by a ring 4*c* that is inserted into the ring receiving groove 4*a* and is elastically expandable. Jaw support grooves 2*a* extending radially outward and in the circumferential direction are provided on the inner circumferential surface of the cap 2 to accommodate the ring 4*c*. The jaw support grooves 2*a* allow the ring 4*c* to move in the radial direction, but restrict the ring 4*c* from moving in the front-rear direction. The plurality of jaws 4 opens and closes radially around the ring 4*c* supported by the jaw support grooves 2*a*.

As shown in FIGS. 14 and 15, a magnet 46 is mounted on an upper part of the roller shaft 28*a*. An initial position (rear end position) sensor 47 and a terminal end position (front end position) sensor 48 are provided on the upper inner circumferential surface of the body housing 11. The initial position sensor 47 and the terminal end position sensor 48 are sensors that detect magnetic fields, referred to as Hall ICs. The initial position sensor 47 is disposed directly above the magnet 46 when the output shaft 27 is located at the rear end position (initial position) as shown in FIG. 14. When the front/rear position of magnet 46 reaches the location corresponding to the initial position sensor 47, the initial position sensor 47 generates a signal. Specifically, the initial position sensor 47 detects the rear end position (initial position) of the output shaft 27 and sends a signal to the controller 9 (see FIG. 1). The terminal end position sensor 48 is disposed directly above the magnet 46 when the output shaft 27 is located at the front end position as shown in FIG. 15. When the front/rear position of the magnet 46 reaches a location corresponding to the terminal end position sensor 48, the terminal end position sensor 48 generates a signal. Specifically, the terminal end position sensor 48 detects the front end position (terminal end position) of the output shaft 27 and sends a signal to the controller 9.

Hereinafter, the driving of the feed screw mechanism 25 and the jaw rotation mechanism 30 will be described. As shown in FIG. 12, the operation member 6 is first pulled causing the motor shaft 20*a* of the electric motor 20 to rotate. The rotary drive of the motor shaft 20*a* is decelerated by the planetary reduction mechanism 22 and transmitted to the gear shaft 23. As the gear shaft 23 rotates, the idle gear 24 meshed with the drive-side gear 23*a* rotates. In addition, the nut 26 rotates around the output axis K together with the driven-side gear 26*a*, which is meshed with the idle gear 24. As the nut 26 rotates, the female thread 26*b* is threadedly coupled to the male thread 27*a* and the output shaft guide 28 prevents the output shaft 27 from rotating, causing the output shaft 27 to move in the front-rear direction as shown in FIGS. 7 and 8. As shown in FIGS. 16 and 17, when the output shaft 27 moves forward, the wedge 3 attached to the front end of the output shaft 27 presses the plurality of jaws 4 and the ring 4*c* to move to the radially outward opening position. When the output shaft 27 moves rearward, the pressing force of the wedge 3 is released, causing the ring 4*c* to contract and the plurality of jaws 4 to return to the radially inward closed position. For example, the plurality of jaws 4 move from the mutually separated position shown in FIG. 15 to the mutually close or contacting position shown in FIG. 14.

As shown in FIG. 12, the electric motor 20 is switched to rotate forward or backward by the controller 9. The output shaft 27 moves forward when the electric motor 20 rotates forward and moves rearward when the electric motor 20 rotates backward. The controller 9 switches the electric motor 20 to rotate forward or backward based on signals transmitted from the initial position sensor 47 and the terminal end position sensor 48.

The electric motor 20 is switched to rotate forward and backward by the controller 9. The output shaft 27 moves forward when the electric motor 20 rotates forward and moves rearward when the electric motor 20 rotates backward. The controller 9 switches the electric motor 20 to rotate forward or backward based on signals transmitted from the initial position sensor 47 and the terminal end position sensor 48.

As shown in FIGS. 7 and 8, when the output shaft 27 moves forward, the push plate 34 attached to the roller shaft 28*a* also moves forward together. The push plate 34 pushes the ball retainer 36 forward against the biasing force of the compression spring 40. As the ball retainer 36 moves forward, the ball 39 engages with the ball groove 33*b*, as shown in FIGS. 14 and 15. As shown in FIGS. 7 and 8, the guide shaft 41 prevents the ball retainer 36 from rotating, causing the rear shaft 33 to rotate in the direction of the second rotation R2. The front shaft 32 to which the rear shaft 33 is threadedly coupled also rotates in the direction of the second rotation R2. At this time, the one-way clutch 42 does not transmit the rotational power of the front shaft 32 to the drive-side gear 43. Therefore, the front shaft 32 rotates in the direction of the second rotation R2, which loosens the threaded connection with the rear shaft 33, but since it idles, the generation of torque to loosen the threaded connection is suppressed. The rotary drive ring 44, which is equipped with the driven-side gear 44*a*, does not rotate because no rotary power is transmitted from the drive-side gear 43. Therefore, the joint 45 connected to the rotary drive ring 44 and the plurality of jaws 4 do not rotate. Thus, the plurality of jaws 4 do not rotate about the output axis K and are pushed by the wedge 3 to open radially outward.

As shown in FIGS. 7 and 8, when the output shaft 27 moves rearward, the push plate 34 attached to the roller shaft 28*a* also moves rearward together. The ball retainer 36 is biased by the compression spring 40 and moves rearward when the pushing force of the push plate 34 is released. When the ball retainer 36 moves backward, the ball 39 engages with the ball groove 33*b*, as shown in FIGS. 14 and 15. As shown in FIGS. 7 and 8, the guide shaft 41 prevents the ball retainer 36 from rotating, causing the rear shaft 33 to rotate in the direction of the first rotation R1. The front shaft 32 with which the rear shaft 33 is threadedly coupled also rotates in the direction of the first rotation R1. At this time, the one-way clutch 42 transmits the rotational power of the front shaft 32 to the drive-side gear 43. Therefore, the front shaft 32 rotates in the direction of the first rotation R1, which further fastens the threaded connection with the rear shaft 33. As shown in FIGS. 16 and 17, the rotary drive ring 44, which is equipped with the driven-side gear 44*a*, rotates in a clockwise direction as viewed from the front due to the transmission of rotary power from the drive-side gear 43. The joint 45 and the plurality of jaws 4 also rotate integrally with the rotary drive ring 44. Thus, the plurality of jaws 4 move from the position shown in FIG. 17 to the position shown in FIG. 16. That is, the plurality of jaws 4 closes radially inward while rotating in a clockwise direction as viewed from the front around the output axis K.

As described above, the operation member is pulled to start the electric motor 20, causing the jaw 4 to open and close and to rotate. In this example of tube expansion tool 1, while the operation member 6 is being operated, the electric motor 20 repeatedly rotates forward and backward, causing the jaws 4 to open and close and to rotate multiple times in succession. The control circuit C is provided on the control board 9*a* of the controller 9 for the repeated forward and backward rotation of the electric motor 20. The control board 9*a* includes a power circuit that supplies power from the battery 8 to the electric motor 20.

Figure 18:
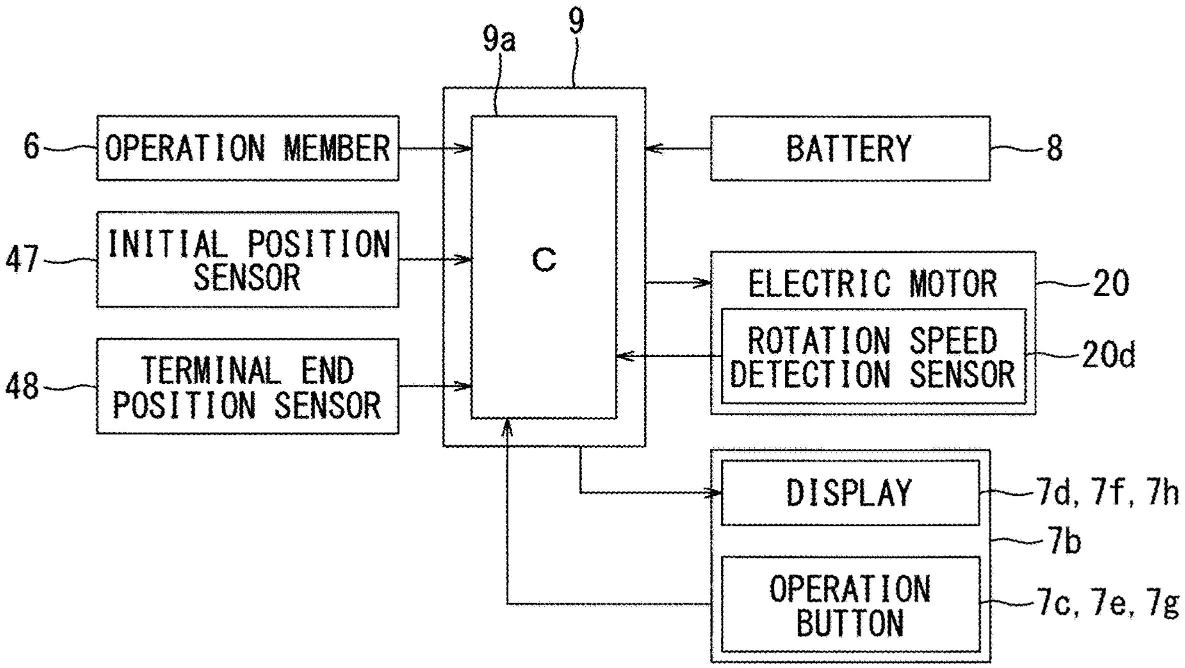
FIG. 18 is a block diagram of a controller.

As shown in FIG. 18, in addition to the ON operation signal from the operation member 6, the ON signal from the initial position sensor 47, and the ON signal from the terminal end position sensor 48, the rotation speed information from the rotation speed detection sensor 20*d* and the information on the number of setting times by operating the operation panel 7*b* are input to the control circuit C. The control board 9*a* includes a detection circuit that detects the rotation speed of the electric motor 20 by the rotation speed detection sensor 20*d*. The number of opening and closing motions of the plurality of jaws 4 (reciprocating motions of the output shaft 27) is set by the user operating the operation panel 7*b* in advance. The information on the set number of motions is stored in the control circuit C as the set number of times P. The set number of times P of opening and closing motions of the jaws 4 is appropriately set according to the PEX tubing 51 that is the target of the diameter expansion work.

Figure 19:
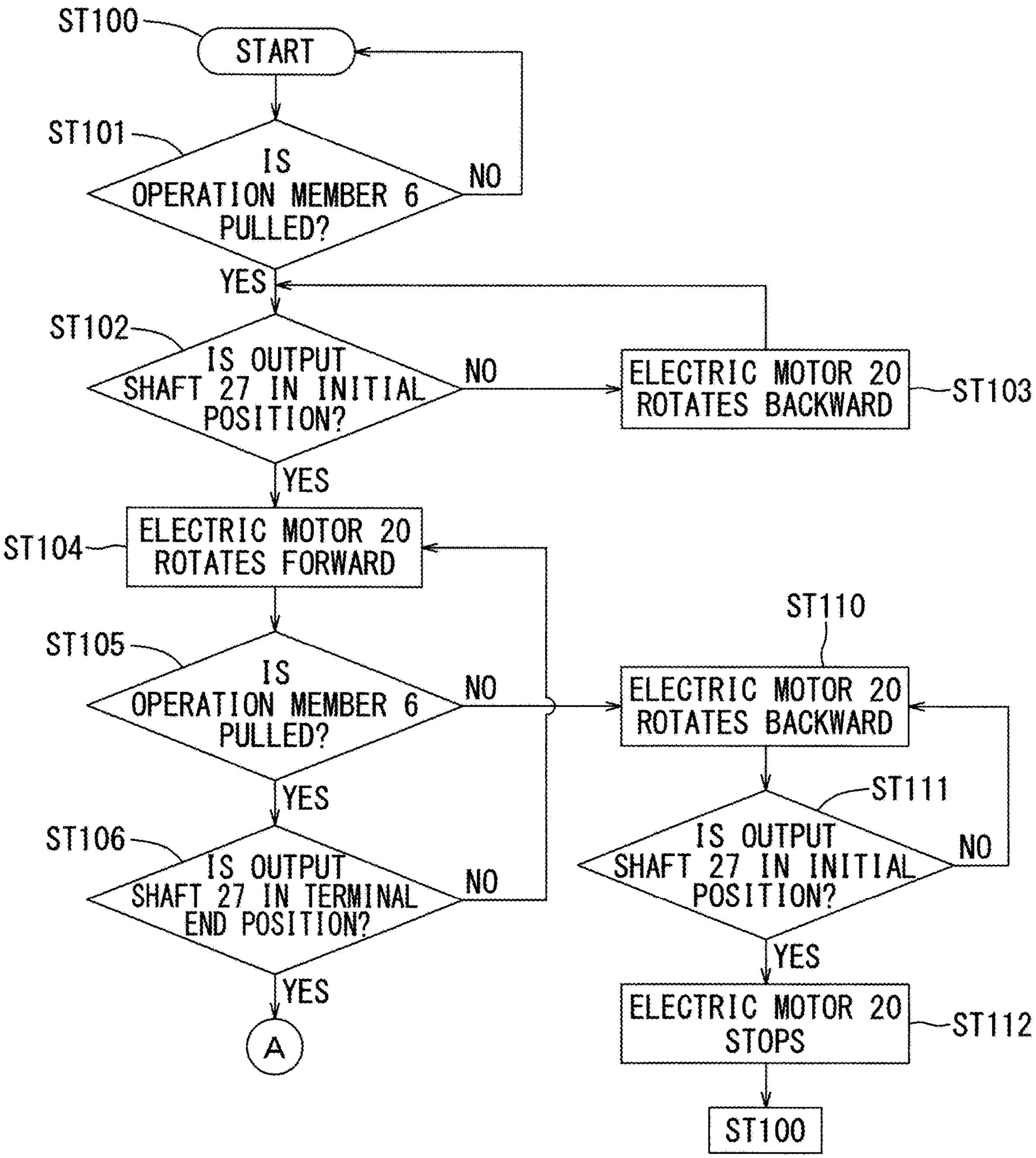
FIG. 19 is a diagram showing a control flow.

FIG. 19 shows a series of operation flow of the tube expansion tool 1 controlled by the control circuit C. When the battery 8 is mounted on the battery mount 7*a*, the operation flow enters a start standby state (Step 100, hereinafter referred to as ST100). When the operation member 6 is pulled in ST101, the position of the output shaft 27 is detected (ST102). In ST102, the ON/OFF status of the initial position sensor 47 is determined to determine whether the output shaft 27 is in the initial position.

If it is confirmed in ST102 that the output shaft 27 is not in the initial position (initial position sensor 47 is OFF), the electric motor 20 rotates backward in ST103. This causes the output shaft 27 to return first to its rear initial position. If it is confirmed in ST102 that the output shaft 27 is in the initial position (initial position sensor 47 is ON), the electric motor 20 rotates forward in ST104. This causes the output shaft 27 to move forward to open the plurality of jaws 4.

While the electric motor 20 rotates forward, the pull operation of the operation member 6 (ON state of the switch body 6*a*) is confirmed in ST105. The electric motor 20 continues to rotate forwardly opening the jaw 4. When the output shaft 27 reaches the terminal end position in ST106, the terminal end position sensor 48 turns ON. The plurality of jaws 4 therefore opens fully.

If the pull operation of the operation member 6 is not confirmed in ST105 during the opening motion of jaw 4, it is determined that the user has released the pull operation of the operation member 6. In this case, the electric motor 20 switches to rotate backward in ST110. As a result, the output shaft 27 begins to move rearward while moving forward, causing the opening motion of the jaw 4 to be interrupted. If the initial position of the output shaft 27 is confirmed in ST111, the electric motor 20 is stopped in ST112. Thus, when the pull operation of the operation member 6 is released during the opening motion of jaw 4, the electric motor 20 rotates backward, causing the output shaft 27 to return to its initial position. As a result, the jaws 4 are returned to the closed state, and the control flow returns to the standby state of ST100.

Figure 20:
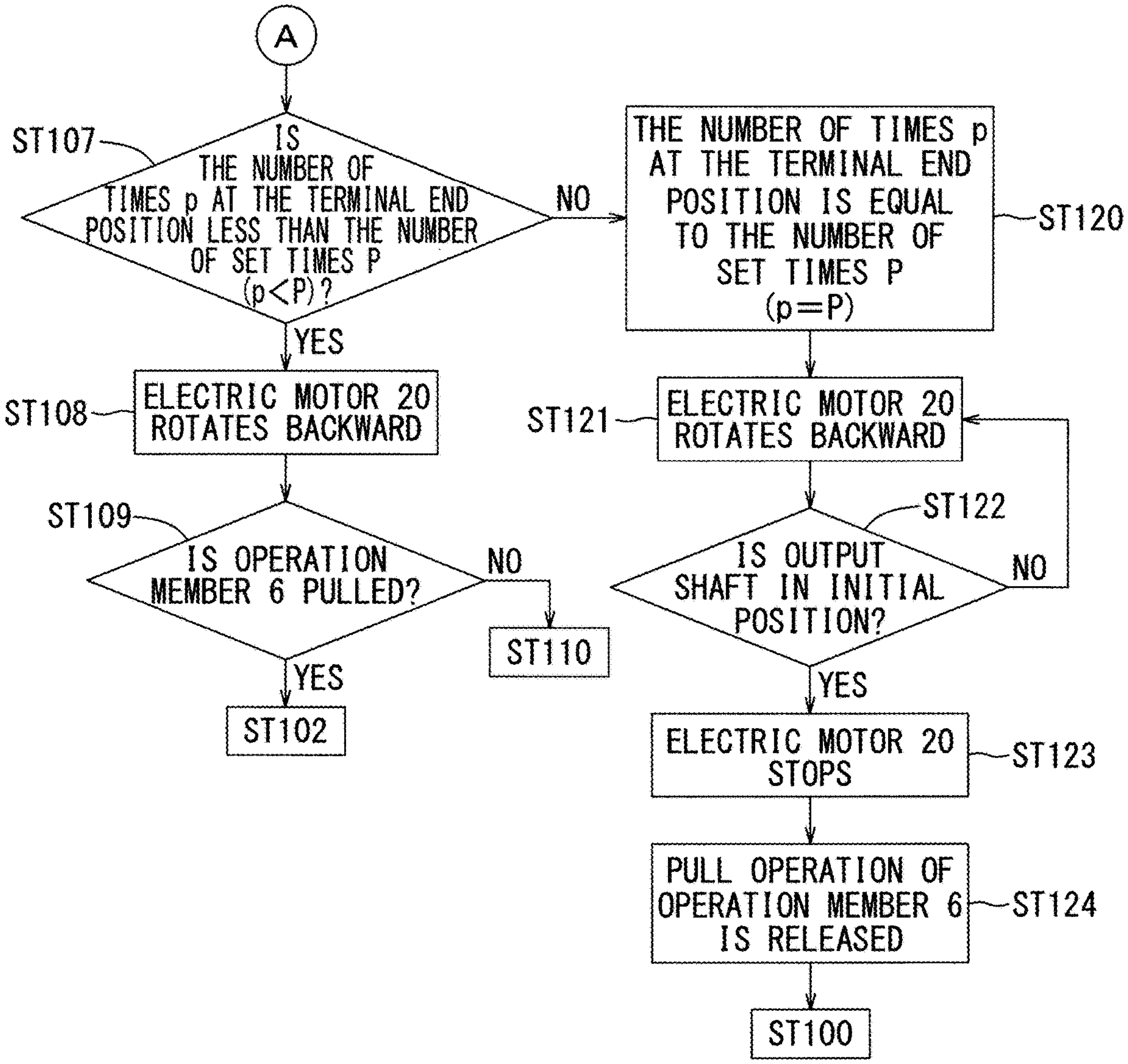
FIG. 20 is a diagram showing the control flow.

As shown in FIG. 20, for example, when the output shaft 27 has reached to the terminal end position and the jaws 4 have performed the diameter expanding operation, the number of ON times of the terminal end position sensor 48 (the number of executed times p of the diameter expanding operation) is counted. In ST107, the counted number of executed times p is compared with the predetermined number of set times P. If the number of executed times p of the opening motion of the jaw 4 is less than the number of set times P (p<P), the electric motor 20 rotates backward (ST108). The output shaft 27 moves rearward to close the plurality of jaws 4, and the jaws 4 rotate around the output axis K via the jaw rotation mechanism 30.

In ST109, the pull operation state of the operation member 6 while the electric motor 20 rotates backward is determined. If the pull operation of the operation member 6 is not confirmed in ST109, the control flow returns to ST110. Therefore, the electric motor 20 stops, when the electric motor 20 continues to rotate backward and the output shaft 27 returns to the initial position. User operation stops, and the control flow returns to the standby state ST100.

When the pull operation state of the operation member 6 is confirmed in ST109, the control flow returns to ST102. In ST102, the initial position of the output shaft 27 is confirmed by the ON signal of the initial position sensor 47. When the output shaft 27 has reached the initial position and the closed state of the plurality of jaws 4 is confirmed, the electric motor 20 is switched to rotate forward again in ST104. This starts the second opening motion of the jaws 4. Thereafter, on the condition that the pull operation of the operation member 6 is confirmed in ST105, the electric motor 20 is rotated forward until the output shaft 27 reaches the terminal end position in ST106 to open the jaws 4 again. On the condition that the pull operation of the operation member 6 is confirmed in ST109, the electric motor 20 rotates backward until the output shaft 27 reaches the initial position in ST102 to close the jaws 4.

In this way, the opening motions of the plurality of jaws 4 are repeated and the number of executed times p is incremented by one each time. It is confirmed in ST120 that the number of executed times p has reached the number of set times P (p=P) via ST107. If p=P is confirmed in ST120, the electric motor 20 is switched to rotate backward to move the output shaft 27 backward in ST121. This causes the jaws 4 to close while rotating around the output axis K.

In a stage where the electric motor 20 rotates backward (the final stage of the number of set times P) in ST121, unlike the backward rotation stage in ST108 (intermediate stage of the number of set times P), the pull operation of the operation member 6 is not confirmed. In the backward rotation stage in ST121, even while the operation member 6 is operating, the electric motor 20 continues to rotate backward to return the output shaft 27 to the initial position and then the electric motor 20 is stopped.

When the initial position of the output shaft 27 is confirmed in ST122 and the closed state of the plurality of jaws 4 is confirmed, the electric motor 20 is stopped in ST123. Then, in ST124, the pull operation of the operation member 6 is released, and the series of control operations are completed.

As described above, in this embodiment, the forward and reverse rotation of the electric motor 20 is switched to cause the output shaft 27 to reciprocate between the initial position and terminal end position multiple times. This allows the opening and closing motions of the jaws 4 to be repeated while the operation member 60 is pulled once and held. Consequently, the workload on the user may be reduced.

According to the embodiment, the initial position and the terminal end position of the output shaft 27 (threaded shaft) are detected by the initial position sensor 47 and the terminal end position sensor 48, respectively. This ensures the reciprocal motions of the output shaft 27 to be performed quickly and reliably.

According to the embodiment, the electric motor 20 rotates backward (ST110, ST111) to allow the output shaft 27 (threaded shaft) to return to its initial position after the pull operation of the operation member 6 (operation member) is released. Therefore, when the operation of the operation member 6 is released in the middle of the number of set times P, the output shaft 27 is returned to the initial position to reliably return the jaws 4 to the closed position. This allows the next operation to be performed quickly.

According to the embodiment, for example, if the output shaft 27 is not in the initial position when the pull operation of the operation member 6 is started, the electric motor 20 rotates backward once to return the output shaft 27 to the initial position. This prevents the output shaft 27 from moving forward from an intermediate position. As a result, the jaw opening motion is not performed from a half-open position, but always starts from the closed position. Therefore, the diameter expanding operation may be performed efficiently.

According to the embodiment, the number of executed times p of the reciprocating motion of the output shaft 27 between the initial position and the terminal end position is counted during the pull operation of the operation member 6. When the number of executed times p of the reciprocating motions reaches the predetermined number of set times P, the electric motor 20 stops to rotate. Therefore, even during the pull operation of the operation member 6, the electric motor 20 automatically stops when the opening motions of the jaws 4 have been performed for the number of set times P. This allows the proper diameter expanding operation to be performed quickly.

According to the embodiment, the electric motor 20 rotates backward (ST121) to stop the output shaft 27 at its initial position when the number of executed times p of the reciprocating motions of the output shaft 27 reaches the predetermined number of set times P (ST120). After the output shaft 27 is returned to its initial position (ST122), the electric motor 20 stops (ST123). Thus, after the opening motions of the plurality of jaws 4 have been performed for the number of set times P, the electric motor 20 automatically stops after the output shaft 27 returns to its initial position. This allows the next diameter-expanding operation to be started quickly.

According to the embodiment, the initial position and the terminal end position of the output shaft 27 are detected by Hall IC sensors (initial position sensor 47 and terminal end position sensor 48). Therefore, the accuracy and compactness of the detection means for detecting the initial position and the terminal end position of the output shaft 27 are ensured.

According to the embodiment, the tube expansion tool 1 includes a feed screw mechanism 25 (ball screw) with balls 27*b* interposed between the output shaft 27 (threaded shaft) and the nut 26 (female threaded member). Therefore, the output shaft 27 may be threadedly coupled smoothly to the nut 26 without rattling. As a result, the output shaft 27 reciprocates precisely and smoothly.

As described above, the tube expansion tool 1 for expanding the end of a synthetic resin fluid pipe has a motor shaft 20*a* rotated by an electric motor 20 as shown in FIG. 12. The tube expansion tool 1 has a feed screw mechanism (power conversion mechanism) 25 that converts rotation of the motor shaft 20*a* into back-and-forth movement of the output shaft 27. The tube expansion tool 1 further has a plurality of jaws 4 that are pushed by a wedge 3 provided at the front portion of the output shaft 27 to mutually open radially outward. The tube expansion tool 1 has a shaft 31 that rotates about an axis in conjunction with the rotation of the motor shaft 20*a*, and a jaw rotation mechanism 30 that rotates the plurality of jaws 4 about an axis by the shaft 31. The output shaft 27, the motor shaft 20*a*, and the shaft 31 of the jaw rotation mechanism 30 are arranged in parallel with each other and overlap each other in the front-rear direction.

Therefore, by arranging the output shaft 27, the motor shaft 20*a*, and the shaft 31 of the jaw rotation mechanism 30 to overlap in the front-rear direction, the tube expansion tool 1 may be provided in a compact manner in the front-rear direction. Furthermore, the output shaft 27, the motor shaft 20*a*, and the shaft 31 are arranged in parallel with each other. Therefore, the tube expansion tool 1 may be provided in a compact manner in the up-down direction or left-right direction, which intersects the front-rear direction.

As shown in FIGS. 12 and 14, the shaft 31 of the jaw rotation mechanism 30 and the electric motor 20 are disposed so that 80% or more of their respective axial lengths overlap the output shaft 27 at the rear end position in the front-rear direction. Therefore, the amount of protrusion of the shaft 31 of the jaw rotation mechanism 30 and the electric motor 20 in the front-rear direction relative to the output shaft 27 is suppressed, particularly at the rearward protrusion relative to the output shaft 27 at the rear end position. This allows the tube expansion tool 1 to achieve greater compactness in the front-rear direction.

As shown in FIGS. 12 and 14, the shaft 31 of the jaw rotation mechanism 30 and the electric motor 20 are disposed to overlap the output shaft 27 at the rear end position in the front-rear direction over their respective entire axial lengths. Therefore, the shaft 31 of the jaw rotation mechanism 30 and the electric motor 20 do not protrude in the front-rear direction relative to the output shaft 27 at the rear end position. This further enhances the compactness of the tube expansion tool 1 in the front-rear direction.

As shown in FIG. 12, the tube expansion tool 1 has a planetary reduction mechanism (transmission mechanism) 22 that changes the rotational output of the motor shaft 20*a*. The tube expansion tool 1 includes an idle gear 24 provided between the planetary reduction mechanism 22 and the feed screw mechanism 25. The planetary reduction mechanism 22 may be disposed to overlap with the feed screw mechanism 25 in the front-rear direction by providing the idle gear 24 therebetween. The electric motor 20 provided near the planetary reduction mechanism 22 may be installed closer to the feed screw mechanism 25. This arrangement allows the tube expansion tool 1 to be provided in a compact manner in the front-rear direction.

Figure 13:
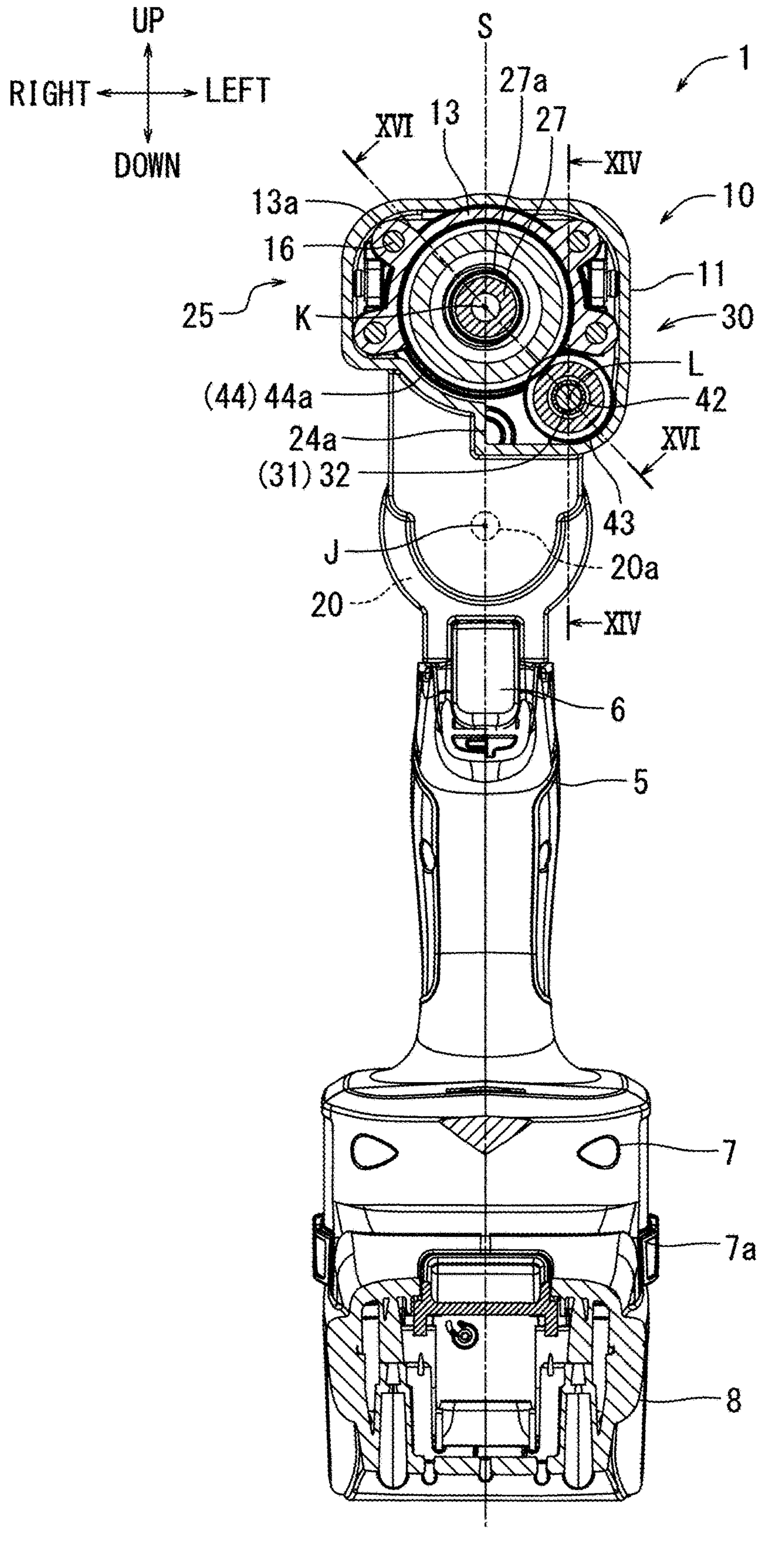
FIG. 13 is a cross-sectional view taken along a line XIII-XIII in FIG. 12.

As shown in FIG. 13, the output shaft 27 and the motor shaft 20*a* are offset in the up-down direction, which is orthogonal to the front-rear direction. The jaw rotation mechanism 30 is located between the output shaft 27 and the motor shaft 20*a* in the up-down direction as viewed in the axial direction of the output shaft 27. The output shaft 27, the jaw rotation mechanism 30, and the electric motor 20 can be compactly arranged not only in the front-rear direction but also in the up-down direction orthogonal to the front-rear direction. This arrangement prevents the tube expansion tool 1 from being elongated in the up-down direction.

As shown in FIG. 13, the jaw rotation mechanism 30 is arranged offset with respect to an imaginary plane S that includes both the motor shaft 20*a* and the output shaft 27. Therefore, the output shaft 27, the jaw rotation mechanism 30, and the electric motor 20 can be compactly arranged in the up-down direction where the imaginary plane S extends on which the motor shaft 20*a* and the output shaft 27 are aligned. This allows the tube expansion tool 1 to be provided in a compact manner in the up-down direction.

As shown in FIGS. 11 and 14, the jaw rotation mechanism 30 includes a one-way clutch 42. The one-way clutch 42 rotates in conjunction with the first rotation R1 (see FIG. 8) of the shaft 31 to rotate the plurality of jaws 4 but does not rotate in conjunction with the second rotation R2 (see FIG. 7) opposite to the first rotation R1 of the shaft 31. The shaft 31 of the jaw rotation mechanism 30 includes a rear shaft 33 and a front shaft 32 that is threadedly coupled to the front portion of the rear shaft 33. The shaft 31 of the jaw rotation mechanism 30 is separable into a rear shaft 33 and a front shaft 32. The rear shaft is assembled into an assembly 35 for rotating the shaft 31. The front shaft 32 is assembled into the tool body 10 for transmitting the rotational drive of the shaft 31 to the plurality of jaws 4. The tool body 10 on the front shaft 32 side and the assembly 35 on the rear shaft 33 side are assembled separately. The front shaft 32 and the rear shaft 33 are screwed together to connect in the front-rear direction. This configuration improves the assemblability of the shaft 31.

As shown in FIGS. 14 and 15, the front shaft 32 is threadedly coupled to be fastened in the direction of the first rotation R1 (see FIG. 8) with respect to the rear shaft 33. Therefore, when the front shaft 32 performs the first rotation R1, torque is transmitted from the front shaft 32 to the plurality of jaws 4 via the one-way clutch 42 and the torque acts in the direction that the rear shaft 33 is fastened against the front shaft 32. Therefore, the fastening force between the rear shaft 33 and the front shaft 32 becomes stronger. On the other hand, when the front shaft 32 performs the second rotation S2 (see FIG. 7), the torque transmitted from the front shaft 32 to the plurality of jaws 4 is a very small in amount. Therefore, the front shaft 32 idles and performs the second rotation S2 almost without being subjected to resistance. The rear shaft 33 rotates in the direction to be loosened with respect to the front shaft 32, but no resistance is exerted on the front shaft 32, therefore it rotates without loosening the fastening force with the front shaft 32. Thus, operation of the jaw rotation mechanism 30 prevents loosening of the threaded connection between the front shaft 32 and the rear shaft 33.

As shown in FIG. 12, the power conversion mechanism is a feed screw mechanism 25 equipped with a male thread 27*a* provided around the outer circumference of the output shaft 27 and a nut 26 into which the male thread 27*a* is inserted. Therefore, the feed screw mechanism 25 may be installed around the axis of the output shaft 27. This may prevent the feed screw mechanism 25 from protruding from the output shaft 27 in the front-rear direction. This allows the tube expansion tool 1 to be provided in a compact manner in the front-rear direction.

As shown in FIG. 12, the tube expansion tool 1 has a grip 5 extending in a direction intersecting the axial direction of the output shaft 27. At least a part of the nut 26 of the feed screw mechanism 25 and at least a part of the electric motor 20 overlap the grip 5 in the front-rear direction. Therefore, the nut 26 of the feed screw mechanism 25 and the electric motor 20 may be arranged near the center of support when a user grasps the grip 5 to support the tube expansion tool 1. This allows for a good weight balance of the tube expansion tool 1 in the front-rear direction.

The tube expansion tool 1 according to the present embodiment described above may be modified in various ways. The tube expansion tool 1 with six jaws 4 was described as an example. Instead, the tube expansion tool 1 may have, for example, five or fewer or seven or more jaws 4.

A configuration has been described as an example in which the shaft 31 of the jaw rotation mechanism 30 and the electric motor 20 overlap the output shaft 27 at the rear end position over the entire length in the front-rear direction. Alternatively, the shaft 31 of the jaw rotation mechanism 30 and the electric motor 20 may overlap with respect to the output shaft 27 at the rear end position, for example, by 80% or 90% of the entire length in the front-rear direction. A configuration has been described as an example in which the shaft axis L is arranged offset to the left of the imaginary plane S that includes the motor axis J and the output axis K. Instead, the shaft axis L may be arranged offset to the right of the imaginary plane S that includes the motor axis J and the output axis K. The imaginary plane S including the motor axis J and the output axis K may be extended at an angle with respect to the up-down direction. A configuration has been described as an example in which the motor axis J, the output axis K, and the shaft axis L are parallel with each other. Alternatively, a configuration in which the motor axis J and the output axis K, the output axis K and the shaft axis L, the motor axis J and the shaft axis L, or any combination thereof are inclined to each other may be included. The inclination angle of the mutually inclined axis may be, for example, 5° or less, or 10° or less.

The jaw rotation mechanism 30 to rotate the plurality of jaws 4 in a clockwise direction as viewed from the front has been described as an example. Alternatively, the jaw rotation mechanism 30 may be configured to rotate the plurality of jaws 4 in a counterclockwise direction as viewed from the front. In this case, the rotational direction of the front shaft 32 in which the one-way clutch 42 transmits power to the drive-side gear 43 is the counterclockwise direction (the direction of the second rotation R2 shown in FIG. 7) as viewed from the front. The male thread 33*a* and the female thread 32*a* are provided to fasten the rear shaft 33 against the front shaft 32 when the rear shaft 33 rotates in the direction of the second rotation R2.

A configuration has been described as an example in which the male thread 33*a* is provided at the front end of the rear shaft 33 and the female thread 32*a* is provided at the rear end of the front shaft 32 to be threadedly coupled to the male thread 33*a*. Alternatively, a male thread 32*a* may be provided at the rear end of the front shaft 32 and a female thread 33*a* may be provided at the front end of the rear shaft 33 to be threadedly coupled to the male thread 32*a*.

A feed screw mechanism 25, referred to as a ball screw mechanism, has been described as an example in which the balls 27*b* are interposed between the male thread 27*a* of the output shaft 27 and the female thread 26*b* of the nut 26. Instead, it may be, for example, a sliding screw mechanism in which the male thread 27*a* and the female thread 26*b* are directly threadedly coupled to each other without a ball interposed therebetween.

According to an embodiment, both the initial position and the terminal end position of the output shaft 27 (threaded shaft) are detected by the Hall IC sensor. Alternatively, only one of the initial position and the terminal end position may be detected by the sensor.

According to an embodiment, the rotation speed of the electric motor 20 is detected by the rotation speed detection sensor 20*d*. The initial position and the terminal end position of the output shaft 27 may be configured to be detected based on the rotation speed of the electric motor 20 detected by the rotation speed detection sensor 20*d* alternative to the Hall IC sensor. In this case, it may be configured in which one of or both the initial position and the terminal end position is detected by a rotation speed detection circuit of the electric motor 20.

The invention claimed is:

1. A tube expansion tool for expanding an end of a synthetic resin fluid pipe comprising:

- a motor shaft being rotated by an electric motor;
- a power conversion mechanism configured to convert rotation of the motor shaft into front-and-rear movement of an output shaft;
- a plurality of jaws configured to mutually open radially outward when being pushed by a wedge provided at a front portion of the output shaft; and
- a jaw rotation mechanism having a shaft configured to rotate an axis in conjunction with rotation of the motor shaft, the shaft causing the plurality of jaws to rotate an axis;
  - wherein the output shaft, the motor shaft, and the shaft are arranged in parallel with each other and overlap each other in a front-rear direction, and
  - wherein the shaft of the jaw rotation mechanism and the electric motor are disposed such that 80% or more of their respective axial lengths overlap the output shaft located at a rear end position in the front-rear direction.

2. The tube expansion tool according to claim 1, wherein the shaft of the jaw rotation mechanism and the electric motor are arranged to overlap the output shaft located at the rear end position in the front-rear direction over their respective entire axial lengths.

3. The tube expansion tool according to claim 1, wherein:

- the output shaft and the motor shaft are offset in an up-down direction orthogonally to the front-rear direction, and the jaw rotation mechanism is located between the output shaft and the motor shaft in the up-down direction as viewed in an axial direction of the output shaft.

4. The tube expansion tool according to claim 1, wherein:

the jaw rotation mechanism includes a one-way clutch, the one-way clutch is configured to rotate in conjunction with a first rotation of the shaft for rotating the plurality of jaws, the one-way clutch is configured not to rotate in conjunction with a second rotation opposite to the first rotation of the shaft, and the shaft of the jaw rotation mechanism includes a rear shaft and a front shaft that is threadedly coupled to a front portion of the rear shaft.

5. The tube expansion tool according to claim 4, wherein the front shaft is threadedly coupled to be fastened in a direction of the first rotation with respect to the rear shaft.

6. The tube expansion tool according to claim 1, wherein the power conversion mechanism is a feed screw mechanism having a male thread provided around an outer circumference of the output shaft and a nut for the male thread to be inserted.

7. The tube expansion tool according to claim 6, further comprising a grip being extendable in a direction intersecting an axial direction of the output shaft, wherein at least a part of the nut of the feed screw mechanism and at least a part of the electric motor overlap the grip in the front-rear direction.

8. The tube expansion tool according to claim 1, wherein:

the power conversion mechanism is a female threaded member, the female threaded member is configured to rotate forward in response to a forward rotation of the electric motor and backward in response to a backward rotation of the electric motor, the output shaft is a threaded shaft, and the threaded shaft is threadedly coupled to the female threaded member and configured to move forward from an initial position to a terminal end position in response to the forward rotation of the female threaded member and rearward from the terminal end position to the initial position in response to the backward rotation of the female threaded member.

9. The tube expansion tool according to claim 8, further comprising a detection means configured to detect both the initial position and the terminal end position of the threaded shaft, respectively.

10. The tube expansion tool according to claim 8 further comprising:

an operation member configured to start the electric motor, and a controller configured to allow the electric motor to repeatedly rotate forward and backward during operation of the operation member to open the plurality of jaws multiple times.

11. The tube expansion tool according to claim 10, wherein the controller is configured to rotate the electric motor backward to return the threaded shaft to the initial position, after the operation member stops operating.

12. The tube expansion tool according to claim 10, wherein the controller is configured to rotate the electric motor backward to return the threaded shaft to the initial position, when the operation member starts operating, and the threaded shaft is not in the initial position.

13. The tube expansion tool according to claim 10, wherein the controller is configured to count a number of reciprocating motions of the threaded shaft between the initial position and the terminal end position during operation of the operation member, and wherein the controller stops the electric motor from rotating, when the number of reciprocating motions reaches a predetermined number of times.

14. The tube expansion tool according to claim 13, wherein the controller is configured to calculate the number of reciprocating motions based on a rotational number of the electric motor.

15. The tube expansion tool according to claim 8, further comprising a detection means configured to detect at least one of the initial position and the terminal end position of the threaded shaft.

16. The tube expansion tool according to claim 15, wherein the detection means is a Hall IC sensor.

17. The tube expansion tool according to claim 15, wherein the detection means includes a detection circuit configured to detect a position of the threaded shaft based on a rotational number of the electric motor.

18. A tube expansion tool for expanding an end of a synthetic resin fluid pipe comprising:

a motor shaft being rotated by an electric motor;

power conversion mechanism configured to convert rotation of the motor shaft into front-and-rear movement of an output shaft;

a plurality of jaws configured to mutually open radially outward when being pushed by a wedge provided at a front portion of the output shaft;

a jaw rotation mechanism having a shaft configured to rotate an axis in conjunction with rotation of the motor shaft, the shaft causing the plurality of jaws to rotate an axis, wherein the output shaft, the motor shaft and the shaft are arranged in parallel with each other and overlap each other in a front-rear direction;

a transmission mechanism configured to change rotational output of the motor shaft, and an idle gear provided between the transmission mechanism and the power conversion mechanism.

19. A tube expansion tool for expanding an end of a synthetic resin fluid pipe comprising:

a motor shaft being rotated by an electric motor;

a power conversion mechanism configured to convert rotation of the motor shaft into front-and-rear movement of an output shaft;

a plurality of jaws configured to mutually open radially outward when being pushed by a wedge provided at a front portion of the output shaft; and a jaw rotation mechanism having a shaft configured to rotate an axis in conjunction with rotation of the motor shaft, the shaft causing the plurality of jaws to rotate an axis;

wherein the output shaft, the motor shaft, and the shaft are arranged in parallel with each other and overlap each other in a front-rear direction, and wherein the jaw rotation mechanism is arranged offset with respect to an imaginary plane including both the motor shaft and the output shaft.

* * * * *